United States Patent [19]

Sadre et al.

[11] Patent Number: 5,485,620

[45] Date of Patent: Jan. 16, 1996

[54] INTEGRATED CONTROL SYSTEM FOR INDUSTRIAL AUTOMATION APPLICATIONS

[75] Inventors: Ahmad Sadre, Solon; Donald F. Baechtel, Lyndhurst; Mark S. Graber, Streetsboro, all of Ohio

[73] Assignee: Automation System and Products, Inc., Chagrin Falls, Ohio

[21] Appl. No.: 201,751

[22] Filed: Feb. 25, 1994

[51] Int. Cl.⁶ .................................................. G06F 9/44
[52] U.S. Cl. ...................... 395/700; 364/138; 364/140; 364/147; 364/188; 364/191
[58] Field of Search ................................ 364/139, 140, 364/141, 146, 188, 147, 191, 192, 193, 167.01, 180, 181, 221, 221.9, 222, 222.6, 280.4, 138, 142, 143, 144; 395/155, 700, 919, 921, 922

[56] References Cited

U.S. PATENT DOCUMENTS

| | | |
|---|---|---|
| 3,974,484 | 8/1976 | Struger et al. . |
| 4,122,519 | 10/1978 | Bielawski et al. . |
| 4,204,253 | 5/1980 | van den Hanenberg et al. ...... 364/200 |
| 4,215,396 | 7/1980 | Henry et al. . |
| 4,215,398 | 7/1980 | Burkett et al. . |
| 4,500,950 | 2/1985 | Putman . |
| 4,636,938 | 1/1987 | Broome .................................. 364/191 |
| 4,663,704 | 5/1987 | Jones et al. ............................ 364/188 |
| 4,736,320 | 4/1988 | Bristol . |
| 4,742,443 | 5/1988 | Rohn et al. . |
| 4,803,634 | 2/1989 | Ohno et al. . |
| 4,823,255 | 4/1989 | Tanaka et al. . |
| 4,852,047 | 7/1989 | Lavallee et al. . |
| 4,910,691 | 3/1990 | Skeirik . |
| 5,072,356 | 12/1991 | Watt et al. . |
| 5,097,405 | 3/1992 | Sato . |
| 5,168,441 | 12/1992 | Onarheim et al. . |
| 5,177,420 | 1/1993 | Wada et al. . |
| 5,212,631 | 5/1993 | Schmidt et al. . |
| 5,225,974 | 7/1993 | Mathews et al. . |
| 5,247,693 | 9/1993 | Bristol . |
| 5,253,186 | 10/1993 | Lipner et al. . |
| 5,265,004 | 11/1993 | Schultz et al. . |
| 5,265,005 | 11/1993 | Schmidt et al. . |
| 5,392,207 | 2/1995 | Wilson et al. ..................... 364/167.01 |

OTHER PUBLICATIONS

Beander, "VAX DEBUG: An Interactive, Symbolic, Multi-lingual Debugger", ACM, 1983, pp. 173–179.
Halpert, "Object Oriented Programming for Motion Control", RAPCON Conference, 1991, pp. 58–68.
Basnet et al., "Experiences in Developing an Object Oriented Modeling Environment for Manufacturing Systems", IEEE, 1990, pp. 477–481.
Barker et al., "User Interface Standards for Control System Design Applications", CACSD Workshop, 1989, pp. 86–93.
Rudolf et al., "Completing the Job of Interface Design", IEEE Software, vol. 9, No. 6, Nov. 1992, pp. 11–22.
Eldeib et al., "Applications of Symbolic Manipulation in Control System Analysis and Design", IEEE, 1989, pp. 269–274.
Stephan et al., "The COSY Control System, a Distributed Realtime Operating System", IEEE, 1991, pp. 1362–1364.
International Electrotechnical Commission (IEC), Draft International Standard (DIS) 1131-3, Feb. 14, 1992.
Electronic Industries Assocation (EIA), Standard RS-274D, Feb. 1979.

Primary Examiner—Kevin A. Kriess
Assistant Examiner—Dennis M. Butler
Attorney, Agent, or Firm—D. Peter Hochberg; Mark Kusner; Michael Jaffe

[57] ABSTRACT

A system for generating, editing, executing, monitoring and debugging an application program for controlling an industrial automation mechanism comprising components of logic, motion and/or process control. The programming and operating environments contain a single Man Machine Interface (MMI) with close and intuitive linkages between sequential programs and continuous programs that aid in the programming, operation and troubleshooting of application programs.

18 Claims, 27 Drawing Sheets

```
PROGRAM PaintPart

INITIAL_STEP PaintPart:
    END_STEP

TRANSITION FROM PaintPart TO S1 PartDetected

STEP S1:
        BEGIN RS274
            N001G00X0Y0Z0
            N002G01X1Y10Z.5F100
            N003Y9
            N004G02G75XZY10I1J9
            N005G01Y2
            N006G02X10Y9I9J9
            N007G01Y2
            N008G0ZX9Y1I9J2
            N009G01X1Y1
            N010G00X0Y0Z0
        END_RS274
        TurnOnPaintGun (P) : N003.AC
        TurnOffPaintGun (P) : N009.DS
        CheckPaintFlow ()
    END_STEP TRANSITION FROM S1 TO END_PROGRAM PAINT.ON AND
PaintRefill
    TRANSITION FROM S1 TO PaintPart PAINT.ON AND NOT
PaintRefill

END_PROGRAM
```

FIG. 10

```
PROGRAM Sample 1
    BEGIN_IL
        LD      1
        AND     OTEnable
        AND(    OTPlus
        ST      OTErr
        OR(     OTMinus
        )
        )
        ST  Stop
    END_IL
END_PROGRAM
```

| | | | |
|---|---|---|---|
| 1. | PROGRAM Sample2 | | |
| 2. | BEGIN_IL | | Root = NULL |
| 3. | LD | 1 | Create R1 = 1 |
| 4. | AND | A | R1 = R1 and A |
| 5. | ANDN | B | R1 = R1 and not B |
| 6. | AND( | C | Push Root |
| 7. | | | Root = R1 |
| 8. | | | Push R1 |
| 9. | | | Push AND_OP |
| 10. | | | Create R2 = 1 |
| 11. | | | R1 = R1 and C |
| 12. | ANDN | D | R2 = R2 and not D |
| 13. | ST | X | X = R2 |
| 14. | ORN( | E | Push R2 |
| 15. | | | Push OR_OP |
| 16. | | | Create R3 = 1 |
| 17. | | | R3 = R3 and Root |
| 18. | | | R3 = R3 and not E |
| 19. | AND | F | R3 = R3 and F |
| 20. | ST | Y | Y = R3 |
| 21. | ) | | Pop OR_OP |
| 22. | | | Pop R2 |
| 23. | | | R2 = R2 OR R3 |
| 24. | | | Discard R3 |
| 25. | ) | | Pop AND_OP |
| 26. | | | Pop R1 |
| 27. | | | R1 = R2 |
| 28. | | | Discard R2 |
| 29. | | | Pop Root |
| 30. | ST | Z | Z = R1 |
| 31. | END_IL | | Discard R1 |
| 32. | END_PROGRAM | | |

FIG. 26b

INTEGRATED CONTROL SYSTEM FOR INDUSTRIAL AUTOMATION APPLICATIONS

FIELD OF THE INVENTION

The present invention relates generally to a system for generating, editing, executing, monitoring and debugging an application program which provides integrated control of sequential and continuous machine processes.

More particularly, the present invention relates to a system for generating, editing, executing, monitoring and debugging an application program which provides simultaneous control of all the logic, motion and process control components of an industrial automation application.

The present invention finds advantageous application to an automated transfer line and will be described with particular reference thereto, it being appreciated that the present invention has broader applications and may be used with other industrial automation applications, including material handling, metal forming, and robotics.

BACKGROUND OF THE INVENTION

A typical automated transfer line, as shown in FIG. 1, consists of a number of work stations where the work piece undergoes various operations, for example metal cutting and forming, in a specific, predetermined order. The flow of the work piece, such as an automotive engine block, from the point of entry into the line, its guidance and navigation through the work stations, and its final exit from the line after successful completion of all automated operations, must be controlled with high order of accuracy to result in the proper synchronization and coordination of the automated transfer line.

It is critical that the operation of the automated transfer line be error free and reliable as the smallest inaccuracy in any part of the control system, such as the communication link between various controls at each work station, can have disastrous results. It is also extremely important that the application program for the automated transfer line be relatively straightforward and reliable for both setup and integration, as well as continuous operation and troubleshooting by the factory floor personnel.

Today, automated transfer line applications generally require logic control (e.g., control of IF . . . THEN conditional actions) and motion control (e.g., control of a servo) and at times process control (e.g., control of the electrical current flow to a welder). It should be noted that motion control can be regarded as a specialized type of process control. Application engineers choose several industrial controllers, each specializing in one of the control technologies (i.e., logic, motion and process control), and each with its own specialized hardware and software implementations. The application engineers then program each of these individual devices, typically using different programming languages and development environments, to control a specific subset of the total industrial automation application. Additional hardware and software interconnections and communications must be added to get the individual devices to work together in a coordinated and synchronized manner. The difficulty and cost of programming, integrating, operating and supporting such a complex system is substantial. Key disadvantages of existing automated transfer line control arrangements include the following:

1. Hardware duplication; each controller usually has its own chassis, computer, I/O and power supply.

2. Multiple operator interfaces and program development support systems; this makes the system more difficult to program, debug and operate resulting in increased system support cost.

3. Error prone inter-connecting logic; the control device interconnections require extra integration time and often represent a major source of the system problems thereby reducing the overall reliability of the total system.

4. Sub-optimized usage of controller performance; generally, one or more of the controllers has much more performance than is required for its assigned portion of the application, and since there is no ability to share workload among different controllers, this excess performance is wasted while the total system cost is increased.

In the typical automated transfer line application shown in FIG. 1, control units 2, 4, 6, 8 and 10 require logic, motion, and/or process control. Accordingly, each of these control units requires multiple industrial controllers. In general, one controller for each control technology will be required at each control unit. The typical implementation process for one of these control units is shown in FIG. 2. The system Integrator or the original equipment manufacturer (OEM) carries the overall responsibility for implementing process plan 20 for an individual control unit. Process plan 20 is developed by a process engineer and the implementation of that plan requires the following tasks to be completed:

A. Separating process plan 20 into individual logic control program steps 22, motion control program steps 24 and process control program steps 26.

B. Selecting, purchasing and integrating individual logic controller(s) 28, motion controller(s) 30 and process controller(s) 32, each having its own hardware, operating system and program development environment.

C. Generating separate programs for each individual controller. In this respect, logic control program steps 22 are typically programmed in graphical ladder language (e.g., Relay Ladder Logic Network); the motion control program steps 24 are typically programmed in RS-274D or a proprietary motion language; and the process control program steps 26 are typically specified in Function Block Networks.

D. Adding inter-controller synchronization interconnections and program logic.

E. Debugging this complex architecture. It is noted that the integrated view of the entire system control, specified via these separate programs, is extremely difficult to observe as the interdependence, coordination and synchronization between the various control components is buried deep within the inter-control communication links and the program for each of the controls. Also, the man-machine interfaces 34a, 34b, and 34c are of a general purpose nature which makes the operation of the entire system very difficult for the factory floor personnel.

F. Documenting, maintaining and supporting the integrated system.

While logic, motion and process control have both sequential and continuous functions, a programmer is concerned primarily with sequential functions with respect to motion control, continuous functions with respect to logic control, and both sequential and continuous functions with respect to process control. Sequential functions are actions which are sequential in nature, while continuous functions are actions which are continuous in nature. Both types of functions will be described in greater detail below.

It has been standard practice to program "sequential" motion control functions using RS-274D or a proprietary motion control language on a computerized numerical control (CNC) or some other type of motion controller, to program "continuous" logic control functions using ladder logic and function blocks on a programmable logic controller (PLC), to program "sequential" process control functions using standard Sequential Function Charts, flow charts, or batch recipes, and to program "continuous" process control functions using Function Block Networks.

Each of these controllers and programs serve a specific need in a portion of the application program and present their own specialized programming environment and unique window into the application domain. Unfortunately, none of these programming techniques can adequately address the entire application requirements alone. When used together, these diverse programming techniques implemented on separate controllers are inefficient, do not integrate or interconnect well, are difficult to operate and troubleshoot, and can be prohibitively expensive. A new, simpler, more integrated solution is needed that does not deviate too far from the methods already used to program and troubleshoot on the factory floor to minimize training time.

Many industrial automation applications require the integration of sequential and continuous programs into a single application program, which controls the sequential and continuous machine processes of an industrial automation application.

Sequential programs are used to control the major sequencing of an application program. Accordingly, sequential program steps are executed only once, one step after the other, like a procedure, waiting for the previous step to complete before the next step is executed. Continuous programs are used to monitor and control environmental conditions either during the entire application program or during specific portions of the application program. Accordingly, continuous programs are scanned repeatedly and executed whenever the qualifying conditions are appropriate.

As noted above, sequential functions are actions which are sequential in nature, and accordingly are most easily and intuitively programmed using sequential programs. Likewise, continuous functions are actions which are continuous in nature, and accordingly are most easily and intuitively programmed using continuous programs.

Examples of sequential functions include:

1. machine operation or sequencing, for example: (a) turn the machine on and wait for all functions to report ready, (b) position the workpiece to be processed, (c) begin processing and wait for the process to complete, (d) shutdown the process, and (e) remove the processed workpiece. This procedure is illustrated by the flow chart shown in FIG. 3.

2. motion control, for example: (a) move from the start position to the first position, (b) move to the second position, (c) go around the corner to the third position, and (d) return to the start position. This procedure is illustrated by FIG. 4.

3. process control, for example: (a) initialize the process output, (b) ramp the process output to level one, (c) wait for some event or signal and then change the process output to level two, and (d) wait for another event and then return the process output to an idle state. This procedure is illustrated by FIG. 5.

Examples of continuous functions include:

1. logic control for scanning operator control input and safety interlocks, programmable interface devices (PID) and other closed feedback loop control, and 2. analog signal processing.

Although it is possible to emulate a sequential function using a continuous program, it is frequently difficult to do so and is more difficult to understand and interpret because the natural "step after step" representation is lost. It is also less efficient because all steps, not just the current one, are being repeatedly scanned or checked for possible execution. It is usually not possible to emulate continuous functions using sequential programs, because only one or a limited number of parallel functions are executed and then further processing is suspended until the conditions required to transition to the next step are met.

A method is needed to program in a natural and integrated fashion a system performing both sequential and continuous functions. It is noted that the IEC-1131's Sequential Function Charts (SFC), as shown in FIG. 6 are a good method of programming and visualizing a sequence of continuous programs, and that Relay Ladder Logic Networks (RLL) supplemented with Function Block Diagrams, as shown in FIG. 21, is a good approach for programming continuous functions. The IEC-1131 international programming language standard for programmable controllers provides specifications for Sequential Function Charts, Relay Ladder Logic Networks, Function Block Diagrams, Structured Text (ST) and Instruction List (IL).

The standard Sequential Function Chart (SFC) shown in FIG. 6, as specified in the IEC-1131, is intended to provide a graphical means for presentation of an application program for controlling both sequential and continuous functions. Step boxes 40 are used to sequence between program steps. As each step box is activated in turn, the action associated with the step box is scanned and executed.

The sequencing between step boxes 40 works well when the actions associated with each step are continuous functions. In applications, such as motion and process control, where the functions to be performed require a significant finite amount of time to complete and must be performed in a sequential manner, the standard SFC becomes difficult to use. Examples of these sequential functions include moving a motor through a series of positions (See FIG. 4) and issuing a series of process control commands based on time or other event inputs (see FIG. 5).

To use a standard SFC diagram, as shown in FIG. 6, in these applications:

1. each sequential program statement must be associated with a separate SFC step box 40;

2. a "pulsed (P)" type action qualifier 48 must precede each sequential program statement that the action invoked only once;

3. each SFC step must set a boolean output variable when it is "done";

4. the "done" output variable must be added to SFC transition logic 42 to sequence to the next SFC step;

5. any continuous program statements that are common to several sequential program statements must be repeated for each SFC step having the sequential program statement;

6. and any exception handling actions that are common to several sequential program statements must be repeated for each.

Additional disadvantages to standard SFC programming include:

1. because of the techniques used above, the SFC diagram tends to get very large and complicated even for simple application programs;

2. the sequential program statements that should be the major focus of the application program become "buried" in a sea of action statement boxes, the main application program functions become obscured, and the overall application program control flow through the sequential program statements is not easily visualized;

3. since a series of sequential program statements must be separated into individual step boxes, it is not possible to insert a group of sequential program statements, such as RS-274D motion commands, that may have been generated by some external (e.g. CAD) program generating package, as a unit into the application program;

4. there are no action qualifiers that will activate action statements after certain motion and process control events, such as "acceleration complete" or "ramp done."

FIG. 6 shows a typical standard Sequential Function Chart, which consists of step boxes 40, transition logic 42, and action statement box 44. Action statement box 44 is comprised of action statement identifiers 46 and action qualifiers 48. Transition logic 42 is evaluated to form a single boolean result that controls the transitions between steps. Action statements associated with an action statement identifier are executed continuously and in parallel at a regular time interval as long as the step to which the action statement identifier is associated is active. Accordingly, when transition logic 42 for a step becomes true, the action statements associated with the step cease execution and the step is deactivated. This process repeats for each step in the SFC.

All of the productive functions performed by the standard Sequential Function Chart are performed by the action statements associated with action statement identifiers 46. The step labels (e.g., "State 1") associated with each step box 40 serve no useful purpose except to uniquely identify each step. If sequential programs are needed (e.g. for programming sequential functions, such as motion and process control), they are encapsulated inside Function Blocks, contained within actions, along with any other continuous program steps that must be performed in that step.

Action qualifiers 48 are used to specify when associated action statements are to be executed. For example, action qualifier "N" indicates that the action statement associated with action statement identifier "Action 1" is to be executed repeatedly, action qualifier "P" indicates that the action statement associated with action statement identifier "Action 2" is to be executed only once, and action qualifier "D" indicates that the action statement associated with action statement identifier "Action 3" is to be delayed.

Implementing motion and process control commands (i.e., sequential programs) using the foregoing constructs makes standard Sequential Function Charts inefficient and difficult to read. The sequential program statements that can be the dominant action of the application program and source of the processing delay in a given step, are "buried" in a sea of action statements. At the same time the step labels of step boxes 40 do nothing to specify what action is being performed in a given application program step. Also, it has been observed that standard Sequential Function Charts are often too large and too detailed to show enough of the application program on one operator screen so that a good grasp of the operational context can be readily visualized. If a standard Sequential Function Chart is used to display the current status of the application program, it often is scrolled or updated too rapidly on the operator's screen to be of much use.

While attempts have been made in the prior art to provide a system for integrating sequential and continuous programs, none of these approaches have solved the basic difficulties encountered. In this respect, the prior art systems have failed to provide integration of the following capabilities:

1. The capability to program, edit, execute, monitor and debug both sequential programs and continuous programs simultaneously in a single integrated environment.

2. The capability to program in programming languages familiar to the industry segment (e.g. logic, motion, and process control industry) of the application.

3. The capability to put the sequential program in a dominant position in the programming paradigm to control the overall sequence of the application program.

4. The capability to add constructs to the application program to allow the sequential and continuous programs to be synchronized (including specific synchronization constructs needed for motion and process control), wherein the constructs are intuitive and outwardly visible in the integrated environment.

5. The capability to provide a graphical programming environment which presents integrated programming paradigms and a simple and intuitive format which is easy for a new user to learn.

Prior art approaches to integrating sequential and continuous programs includes: computerized numerical control (CNC), flow chart programming, and standard Sequential Function Chart programming.

Computerized numerical controls provide technology which allows the user to write sequential programs using the RS-274D programming language (which is the industry standard for specification of motion control programs) and to write continuous programs using Relay Ladder Logic Networks. Both programs can be programmed and executed on a single hardware platform. However, computerized numerical controls do not allow the sequential and continuous programs to be programmed, edited, executed, monitored and debugged in a single programming environment. In addition, the constructs used by computerized numerical controls to synchronize sequential and continuous programs are embedded in the continuous program and are not easy to visualize. Furthermore, additional program logic must be added by the user to both the sequential and continuous programs in order to properly synchronize them.

Flow chart programming provides technology which allows the user to write sequential programs using a graphical flow chart language. However, flow chart programming is deficient in integrating sequential and continuous programs. In this respect, any continuous program must be simulated by use of many flow charts. This does not allow continuous programming paradigms which are standard in the industry, such as Relay Ladder Logic Networks and Function Block Networks. Furthermore, no constructs are provided to synchronize sequential programs with continuous programs.

Standard Sequential Function Chart programming allows the user to write continuous programs using industry standard Relay Ladder Logic networks and Function Block Networks. These continuous programs are sequenced using Sequential Function Chart step boxes and transition logic. However, sequential programs are subordinate to the continuous programs. In this respect, a sequential program (e.g., a RS-274D program) may be called from a continuous program (e.g., Relay Ladder Logic network), but not vice versa. Importantly, since a sequential program specified in this way is subordinate to the continuous program, the sequential program cannot be used to provide overall sequencing of the application program. Accordingly, the sequential program cannot assume a dominant position in the programming paradigm. Therefore, although standard Sequential Function Chart programming allows continuous programs to be sequenced, this function does not meet the needs of sequential functions performed in most industrial automation applications. Any programming language used in the industry to perform sequential functions (e.g., Structured Text, Fortran, BASIC and RS-274D), must execute subordinate to a continuous program. Consequently, any sequential program used in this way cannot be used to provide sequencing for the application program. For example, a computerized numerical control application which uses RS-274D motion commands to execute a motion profile cannot be implemented using a standard Sequential Function Chart. In addition, no constructs are provided by a standard SFC to synchronize the sequential programs with the continuous programs.

In industrial automation applications, great care must be taken that every foreseeable circumstance, especially those caused by faults or failures in the system be accounted for and handled appropriately by the application program. The machinery might fail, motors may be late getting into position or stop altogether, functions being performed may take longer than expected or may not be able to be accomplished at all, the items being processed may contain some disastrous defect. The programming languages used for these applications must be able to accommodate the addition of routines to handle these exceptions to normal operations.

In the IEC-1131 standard there is no special mechanism in place for exception handling. Actions must be added to the continuous programs to detect the exceptions, but once the exceptions are detected there is no special mechanism in the IEC-1131 standard for the continuous program to force a transition in the Sequential Function Chart to a new step. This can be accomplished in the IEC-1131 standard by setting a boolean variable in the continuous program and adding transition logic to the Sequential Function Chart to go to a new step. But since each step in the Sequential Function Chart should include checks for several possible exception conditions that may be handled in many different ways, the addition of these exception branches to the Sequential Function Chart make standard SFC diagrams very complicated and make it difficult to discern the normal operation sequence of the application program.

The present invention also addresses several other disadvantages of prior art programming systems. In this respect, the present invention addresses deficiencies of prior art Relay Ladder Logic program editors and of the standard implementation of the RS-274D programming language. The present invention also addresses the deficiencies of prior art approaches to debugging programs and prior art manual application sequencers.

Prior art implementations of Relay Ladder Logic program editors lack several features which make Relay Ladder Logic Networks easier to edit. Once a program is constructed, prior art editors make it difficult to make certain changes to the program that may be necessitated by: (1) errors or omissions in the original application program or (2) changes or additions to the machine's functionality. In some cases, especially when logic branching is involved, in order to add or move relay logic elements and branches to logic rungs, a portion of the ladder rung must be deleted, along with the ladder elements and information entered on the rung, in order to modify the logic rung appropriately. It is not possible on the prior art to move ladder elements, portions of a ladder rung and logic branches around freely in the Relay Ladder Logic Network.

On prior implementations of Relay Ladder Logic program editors, logical outputs are limited to the right hand end of the logic rung. Some editors only allow one output per rung. Others that allow multiple outputs, require that they be entered on separate output branches. These restrictions: (a) cause the logic programs to be less efficient, (b) force replication or addition of logic rungs in order to achieve multiple outputs, (c) limit the use of Function Blocks within the Relay Ladder Logic Network, (d) do not allow logical outputs on "OR" branches or other locations on the logic rung that can be used for diagnostic purposes or to reduce the size and complexity of the Relay Ladder Logic Network.

FIG. 26a shows a Relay Ladder Logic Network with three output coils, namely output coils X52, Y54, and Z56. FIG. 26b shows the corresponding IEC-1131 Instruction List (IL) program that is generated following the rules in the IEC-1131 standard specification. The IEC-1131 standard specification provides rules for embedding an Instruction List (IL) program within a Structured Text (ST) program. FIG. 26b also shows a listing of computer pseudo-code instructions that demonstrate the actions performed by the controller to evaluate the IL program of FIG. 26a.

Prior implementation of algorithms to evaluate boolean logic programs resemble those commonly used for solving algebraic expressions. These algorithms use a single data stack to recursively store partial results and other information required to evaluate the program. Referring to FIGS. 26a and 26b, whenever a logical branch in the ladder logic occurs (e.g., logical branch point 58), as signaled by a left parenthesis "(" in line 14 of FIG. 26b, the logical result calculated thus far is pushed onto the stack, and a new result variable is created [line 16]. At the same time, a deferred operator function "AND" [line 9] or "OR" [line 15] is also pushed onto the stack. The deferred operator indicates the operation to be performed to combine the new result with the old one once logical branch 58 is completed, as signaled by the right parenthesis ")" [line 21]. The new result is initialized to a logical 1 [line 16]. The new result is used to evaluate the ladder logic rung fragment that lies between the branch points 58 and 60 (i.e. between the parenthesis "( . . . )" in IL). When the right parenthesis is encountered [line 21], the deferred operation is popped off the stack [line 21] along with the old result [line 22]. The deferred operator is used to combine the new result with the old result [line 23]. The old result holds the results of the combined operation [line 23] and the new result is discarded [line 24].

The foregoing standard algorithm works well for evaluating Relay Ladder Logic Networks that only have logical output coils at the end of a ladder logic rung, but it does not work for Relay Ladder Logic Networks that can have logical output coils in any location on the rung. This is demonstrated by output coil Y 54 in FIG. 26a that is equal to "A and NOT B and NOT E and F". It is not equal to "NOT E and F" as would be computed by the foregoing standard algorithm. The shortcoming of the standard algorithm is that the new result used to evaluate the "OR" branches is initialized to 1 [line 16]. For arbitrary logical outputs, the "OR" branches of the ladder logic rung must be "AND'd" with the partial results of the ladder logic rung that was computed up to the point where the logical branching occurred [line 17]. A new algorithm for evaluating boolean logic expressions is needed that allows the placement of logical outputs anywhere within the Relay Ladder Logic Network.

Although RS-274D is a popular motion control programming language on the factory floor, it is limited in that the standard commands can only assume numerical values. This prevents RS-274D programs from using computed values as parameters, controlling the flow of application programs, and synchronizing with other system input-output (I/O) activities. Accordingly, enhancements to the standard RS-274D programming language are needed to improve the utility of the programming language.

Another problem encountered with prior art programming systems is that it has been difficult to debug application programs having intermittently occurring problems. In this respect, the conditions that cause the problem are often difficult to locate and repeat, are complex, and may appear and disappear rapidly. Furthermore, an engineer may not be present to observe the system when the problem occurs, or the problem may be difficult to identify because it can reside with either the hardware or the software. Prior art debugging programs have failed to provide a system which addresses the foregoing problems.

With respect to prior art approaches to debugging, some programmable logic controllers (PLC) provide I/O contact histograms and/or I/O timing diagrams. Some prior art controllers provide trend diagrams, while circuit emulators provide a program execution trace. However, none of the prior art controllers use this information to replay the events using the application program to graphically replay program execution and system-wide status information simultaneously on the same display. Accordingly, a new system for debugging is needed to overcome the limitations of prior art systems.

Many industrial applications today are operated by personnel which have had little exposure to computer technology. This requires that the operator interface for the application be very simple and intuitive to use with a minimal amount of training. Many application programs follow a simple sequence of steps which must be followed in a specific order. Also, in many applications, specific steps must be periodically performed. The operator in such applications are frequently required to manually sequence the application program through these steps in order to observe the results, sometimes taking measurements, sometimes making adjustments, and sometimes executing a special operation.

Prior art systems provide a software interface which ties a simple sequence of operator buttons to the steps of an application program to allow the operator to manually sequence the steps. In the prior art, the application engineer must individually create each button and link the button control and status to the individual steps of the application program. A new method is needed which will create this sequenced set of operator buttons and automatically link the operator buttons to the application steps, providing standard functionality for button control and status.

SUMMARY OF THE INVENTION

According to the present invention there is provided an apparatus for generating, editing, executing, monitoring and debugging an application program for controlling one or more machines comprising means for generating a diagram representing an application program for controlling at least one sequential function and at least one continuous function, said diagram including at least one sequential program having one or more sequential program statements and at least one continuous program, wherein said at least one sequential program sequence sequences said application program, and means for executing said application program to control said one or more machines.

According to the present invention there is also provided an apparatus for manually sequencing an application program for controlling one or more machines comprising means for generating a top level program representing said application program, said top level program comprising application program steps, means for associating an operator button with each said application program step, said operator button activated by an operator, and means for executing said top level program, wherein said operator button associated with each application program step must be activated before said associated application program step is executed.

According to the present invention there is further provided an apparatus for generating, editing, executing, monitoring and debugging an application program for controlling one or more machines comprising means for executing the application program, means for storing status information of said apparatus while said application program is executing, said status information including at least one of the following: status of application program executing on said apparatus, status of physical inputs to the apparatus, status of physical outputs from the apparatus, status of internal condition of the apparatus, and a time-stamp indicating the time at which said status information was stored; and control means for terminating execution of the application program and for retrieving the status information stored by said means for storing; and means for displaying said status information retrieved by said control means.

It is an object of the present invention to provide an integrated control for an industrial automation application.

It is a further object of the present invention to provide improvements to the programming and operational characteristics of an integrated control for an industrial automation application.

It is an object of the present invention to provide a single man-machine interface for generating, editing, executing, monitoring, and debugging an application program for an industrial automation application.

It is another object of the present invention to provide a single integrated environment for programming, editing, executing, monitoring and debugging both sequential and continuous programs simultaneously.

It is still another object of the present invention to provide a system for generating, editing, executing, monitoring and debugging an application program, wherein a sequential program assumes an easy to visualize position relative to a continuous program in the programming paradigm to control the sequencing of the application program.

It is still another object of the present invention to provide an apparatus for handling a hierarchy of application programs.

It is another object of the present invention to provide an enhanced Relay Ladder Logic editor which allows for placement of logical outputs anywhere in a Relay Ladder Logic Network and allows for multiple outputs per ladder rung.

It is still another object of the present invention to provide a system which allows for parameterized RS-274D commands with other standardized programming languages.

It is yet another object of the present invention to provide a system for debugging an application program which plays back the application program and system-wide status to the operator.

It is another object of the present invention to provide a manual application sequencer which ties a sequence of operator buttons to an application program.

DESCRIPTION OF THE DRAWINGS

FIG. 10 shows an IEC-1131 Structured Text translation of the enhanced SFC shown in FIG. 9a.

FIG. 26b shows the Structured Text (ST) program generated by the Logic Editor for the RLL Network of FIG. 26a. Also shown is pseudo-code corresponding to the ST program of FIG. 26a.

DETAILED DESCRIPTION OF THE PREFERRED EMBODIMENT

Broadly stated, the present invention is directed to a hardware and software arrangement and programing environment for controlling an industrial automation application, such as an automated transfer line. A preferred embodiment of the present invention comprises a graphical user interface for generating, editing, executing, mottoring and debugging an application program for controlling an industrial automation application.

Figure 1:
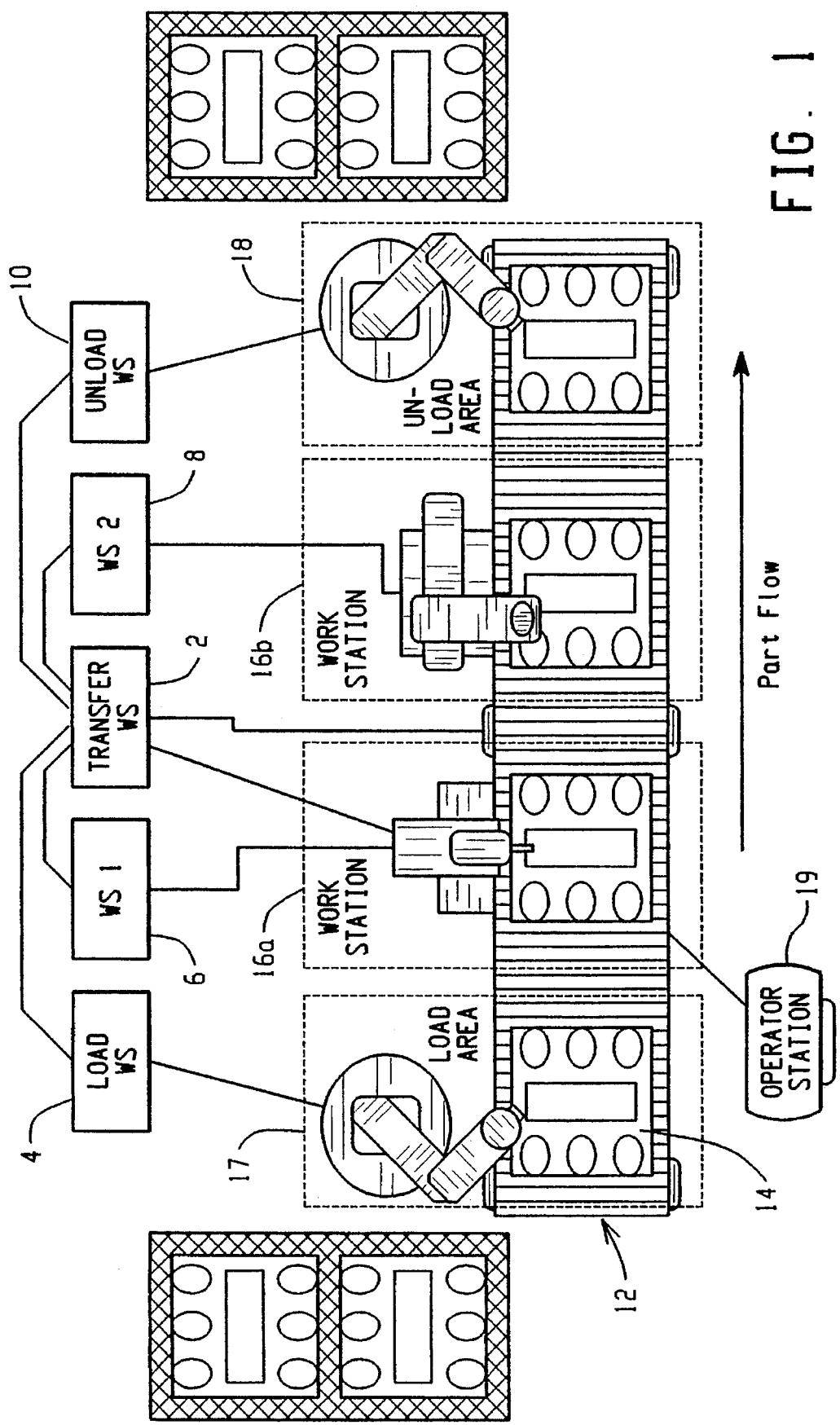
FIG. 1 is on overhead view of a typical Automated Transfer Line Application.
Figure 2:
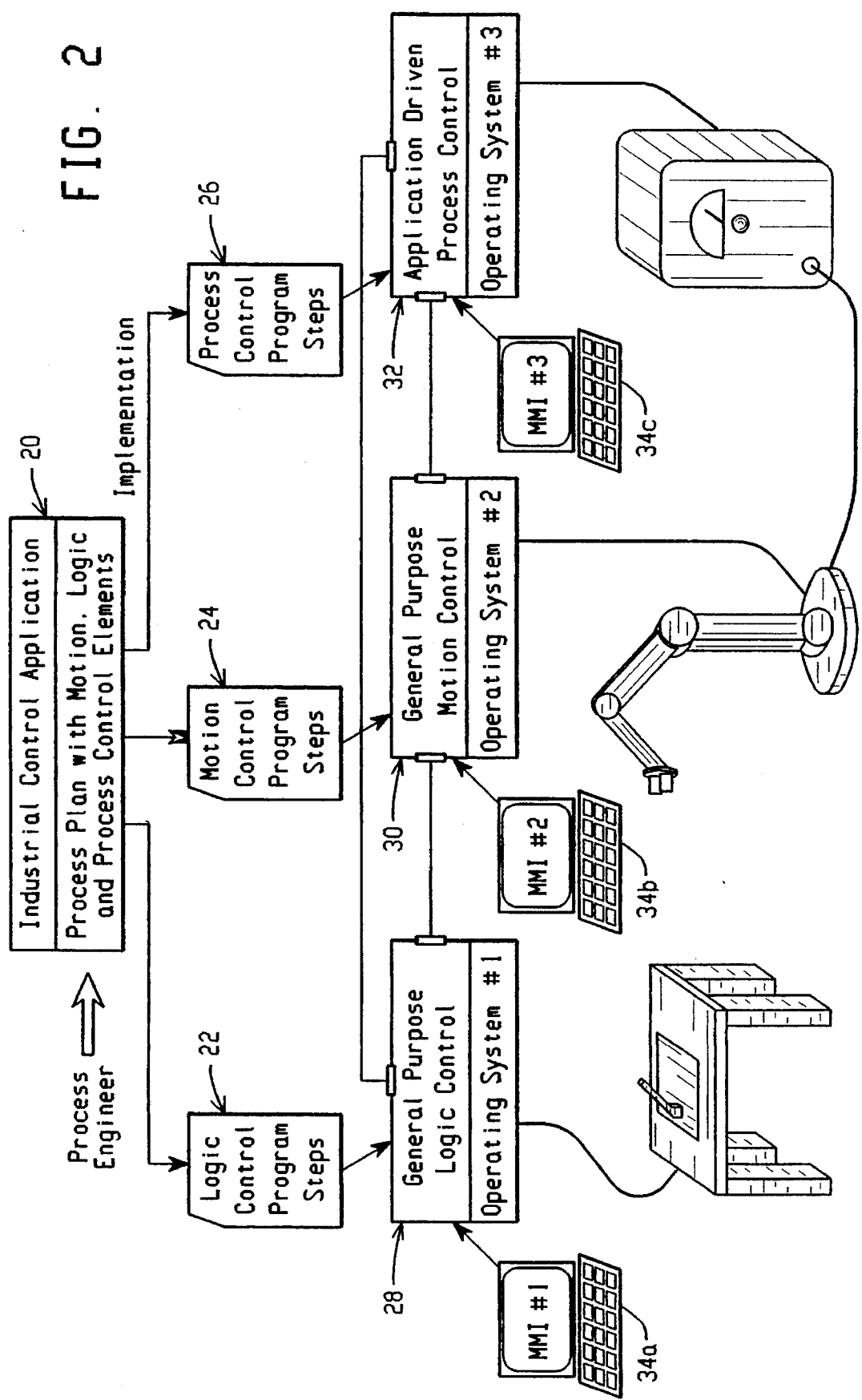
FIG. 2 is a diagram illustrating the procedure followed by an application engineer using prior art systems to implement a typical Automated Transfer Line application involving elements of logic, motion and process control.
Figure 3:
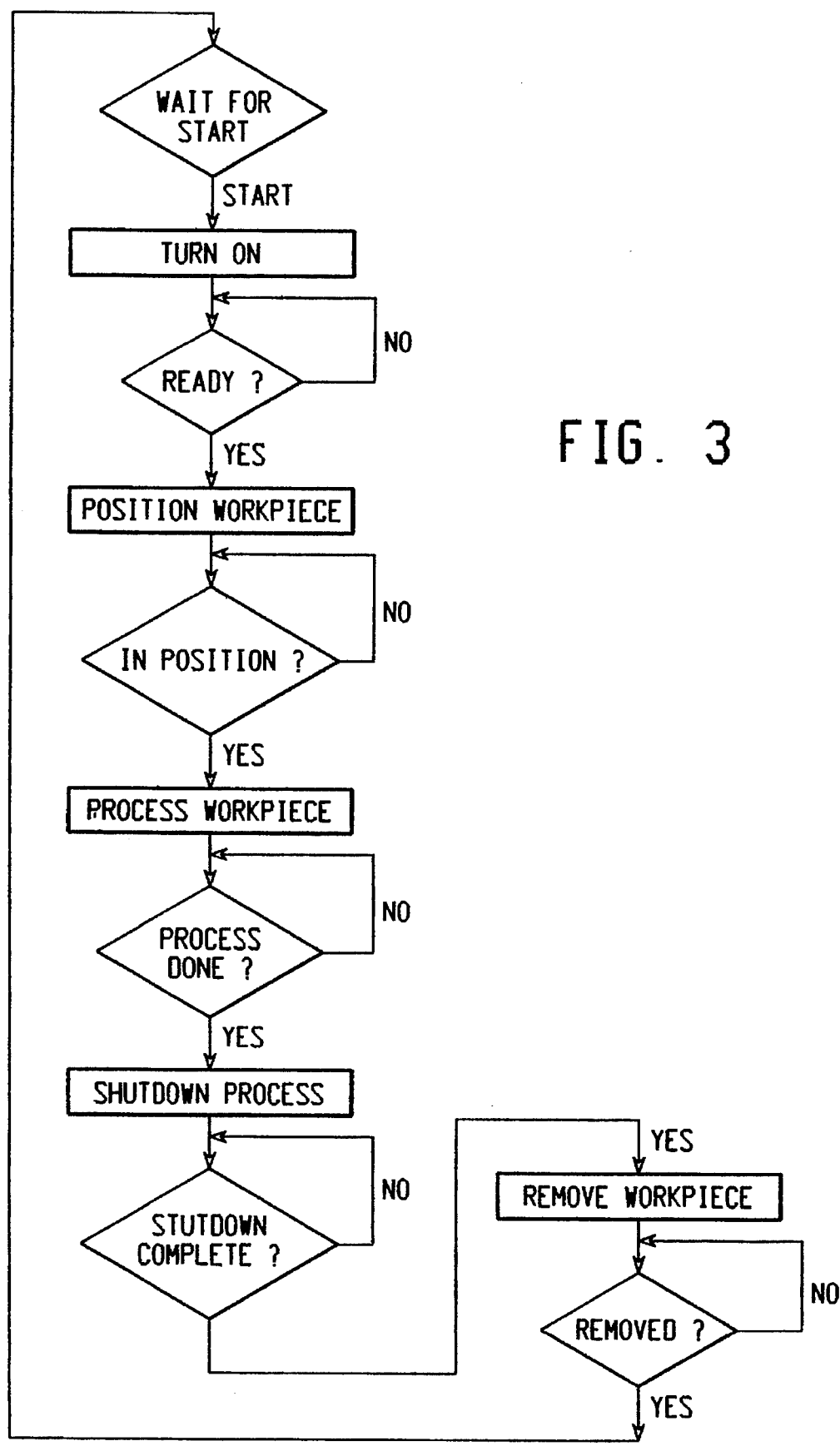
FIG. 3 is a flow-chart of a representative sequential machine process.
Figure 4:
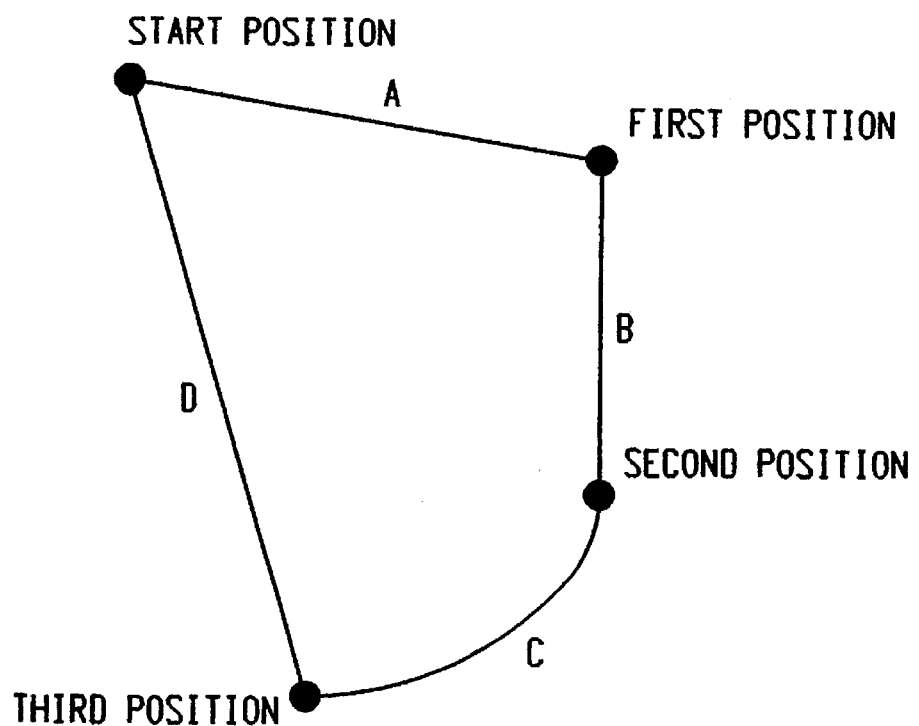
FIG. 4 is a position diagram of a representative motion control application.
Figure 5:
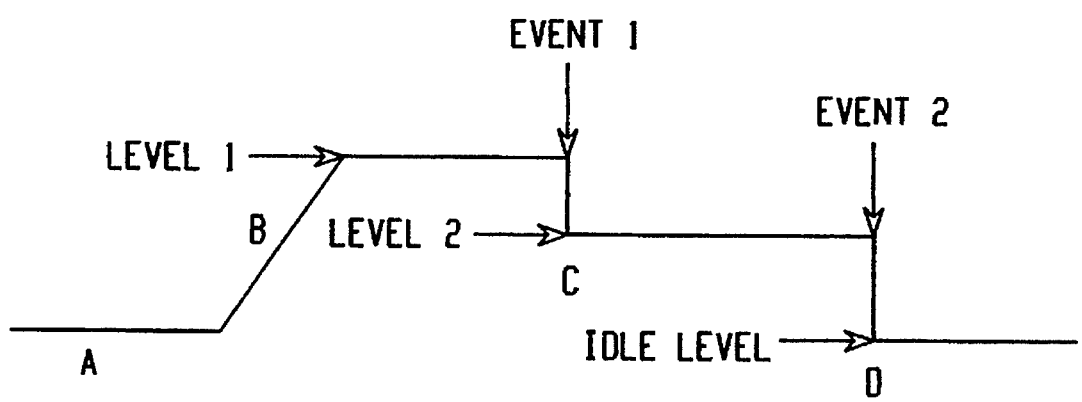
FIG. 5 is an output level graph of a representative process control application.
Figure 6:
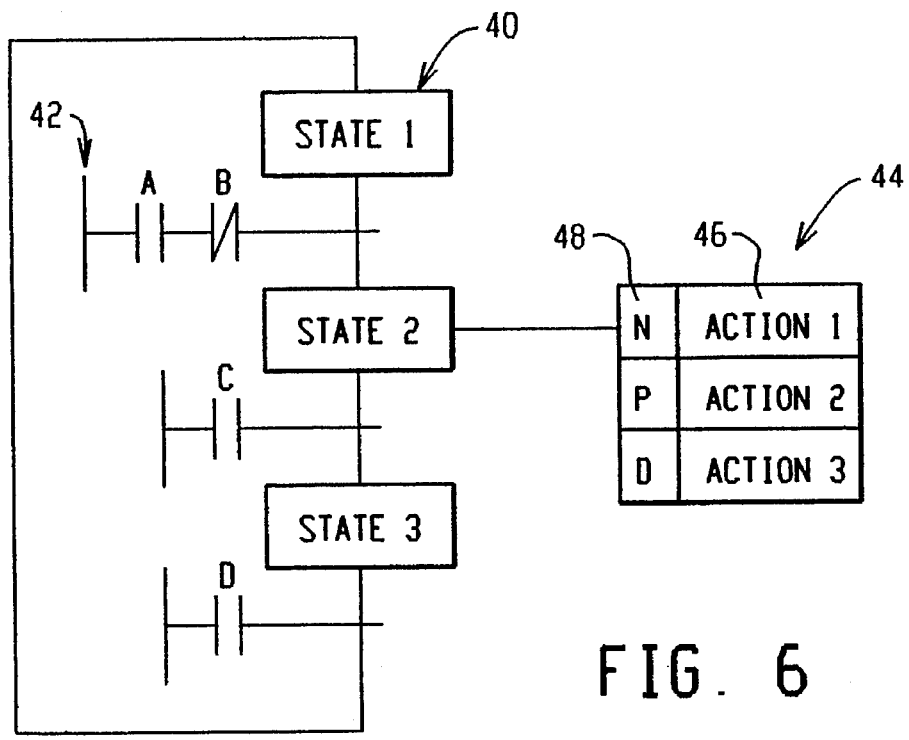
FIG. 6 is an example of a standard Sequential Function Chart conforming to the IEC-1131 standard.

FIG. 1 shows an overhead view of a typical Automated Transfer Line system. It consists of a part conveyance mechanism 12 that moves parts 14 through one or more work stations 16a, 16b where automated processing operations are performed. The operations performed at the work stations consist of any type of automated operation or sequence of operations that include, but are not limited to: part manipulation, cutting, drilling, grinding, boring, mechanical assembly, applying paint or adhesives, testing, gauging, or packaging. The Transfer Line generally includes an automated or manual part loading mechanism 17 and unloading mechanism 18 where parts are placed upon or removed from part conveyance mechanism 12.

Each work station 16a, 16b, load mechanism 17 and unload mechanism 18 is usually controlled by a separate control unit 4, 6, 8, 10 which is responsible for the operations performed in one individual work area. The Transfer Line system usually includes a separate control unit 2 that is responsible for the operation of parts conveyance mechanism 12, the synchronization of the operations of work stations 16a, 16b with the movement of parts into and out of the work areas, as well as providing any operator controls and human interface necessary for the operation and monitoring of the overall Transfer Line system. The synchronization of work stations 16a, 16b to the Transfer Line control unit is usually accomplished by interconnecting each individual work station control unit to Transfer Line control unit 2.

Figure 24:
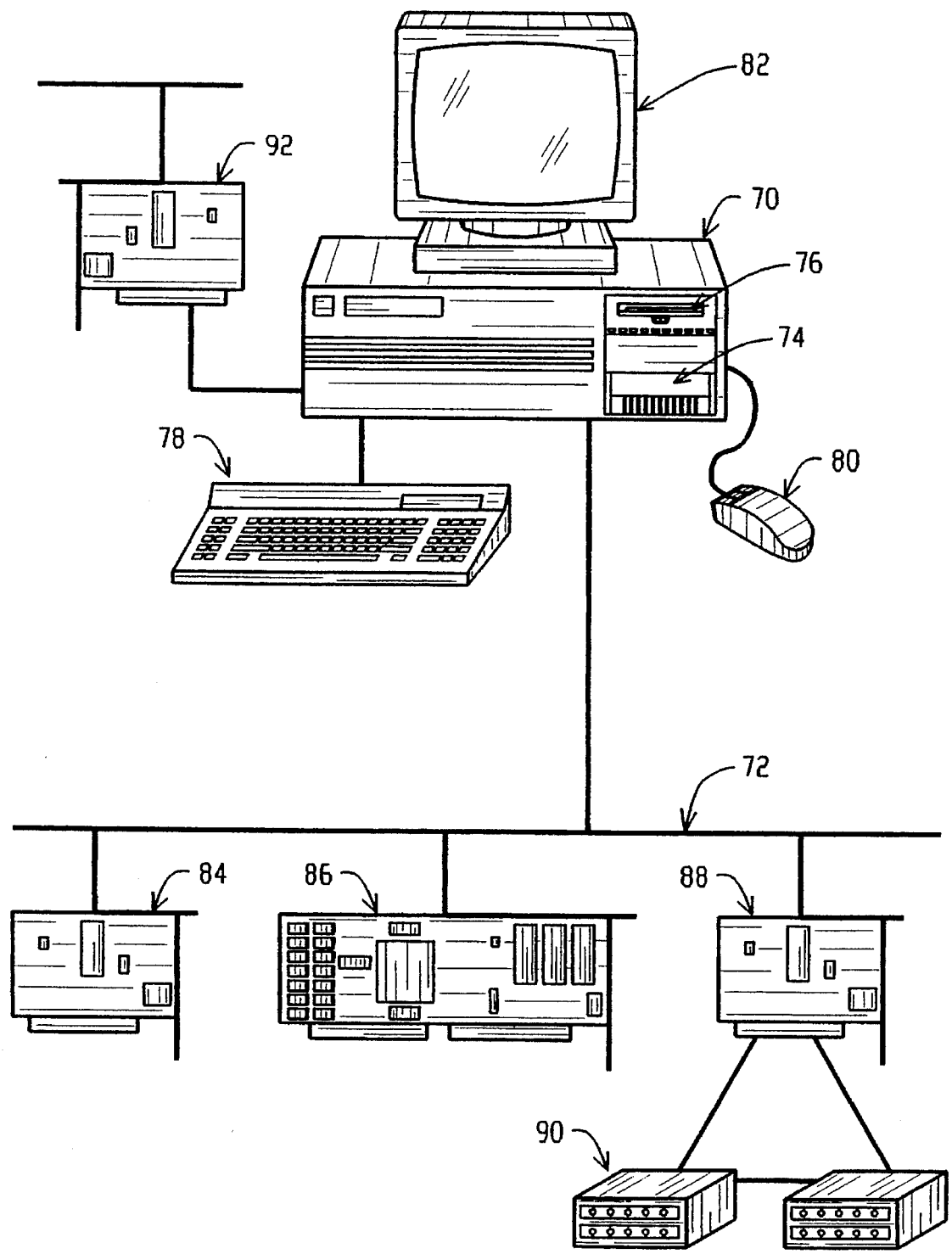
FIG. 24 shows the hardware components comprising a preferred embodiment of the present invention.

Referring to FIG. 24, a preferred embodiment of the present invention is comprised of the following components, which substitutes for one or more of the prior art control units 2, 4, 6, 8, 10 shown in FIG. 1:

486 DX2 66 MHz PC/AT compatible computer 70 having at least 16 Megabytes of Random Access Memory (RAM), a Realtime Windowing Operating System, and ASIC-100 firmware for Transfer Line Applications EISA standard 32 bit passive backplane 72

170 Megabyte or larger Hard Disk mass storage 74

1.44 Megabyte Floppy disk 76

101 key keyboard (optional) 78 serial interface Mouse (optional) 80

14" computer monitor with touch screen overlay 82

I/O Interface card 84

Servo Motion card (optional) 86

Distributed I/O Interface card(s) (optional) 88

Distributed I/O modules (optional) 90

Ethernet LAN Interface card(optional) 92

It should be noted that EISA backplane 72, I/O Interface card 84, Servo Motion card 86, Distributed I/O interface card 88 and LAN interface card 92 are internal components of computer 70, which comprises an "integrated controller." They are shown external to computer 70 solely for the purpose of illustration.

Keyboard 78, mortise 80 or monitor touch screen 82 is used by the operator as a pointing device for menu selection, program development, program editing, program debugging, command button activation, and selection of icons or function blocks.

I/O interface card(s) 84 connect local I/O devices directly to computer 70. Servo Motion card 86 is used to interface one or more servo motors and/or stepper motors to computer 70. Distributed I/O interface card 88 is used to connect one or more Distributed I/O Modules 90 to computer 70.

The graphical environment of the present invention uses a point and click type of user interface technology, which preferably provides on-line help to make the programming and debugging constructs simple and intuitive.

Figure 9A:
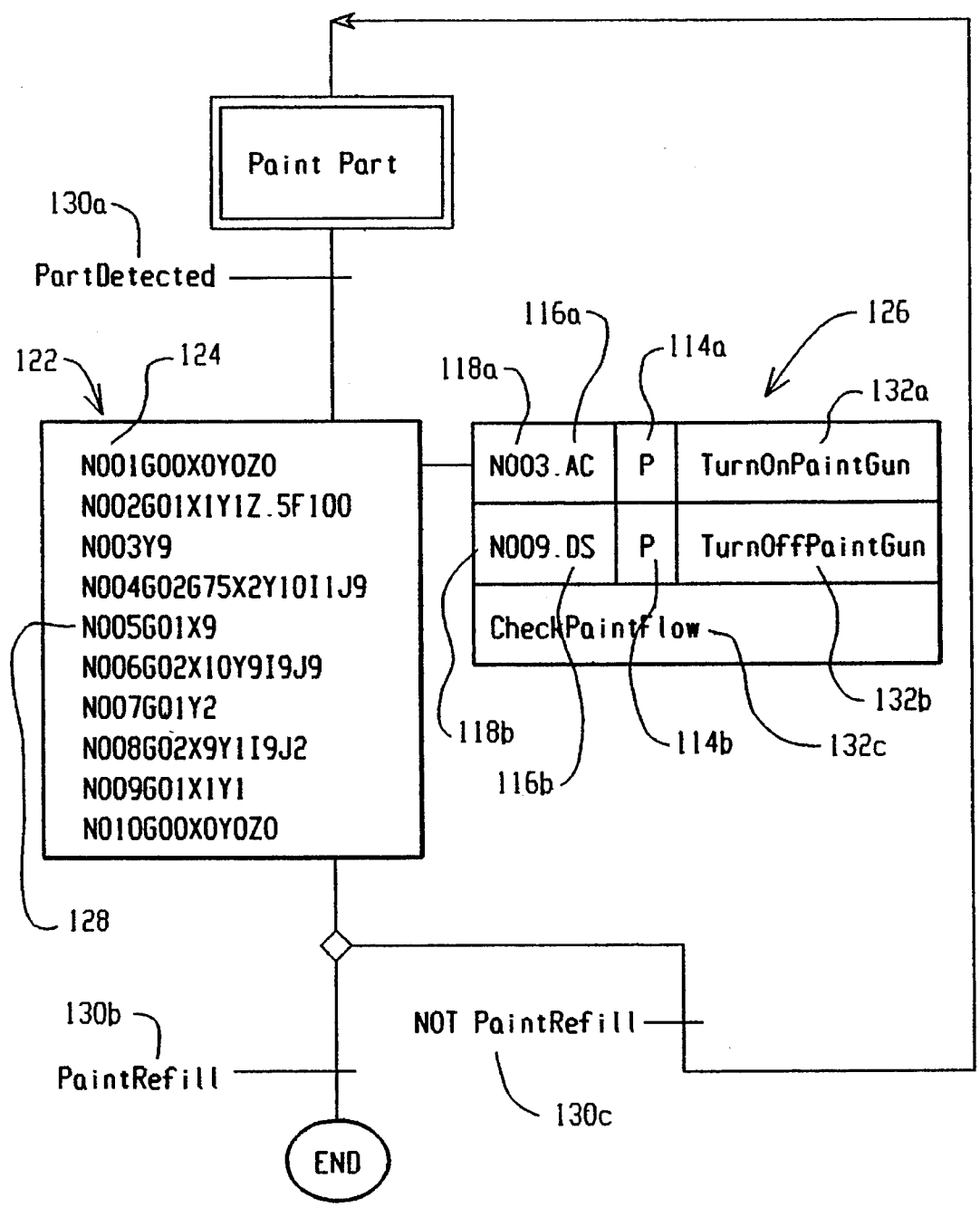
FIG. 9a is an example of an enhanced Sequential Function Chart having action qualifiers for motion in an action statement box.
Figure 9B:
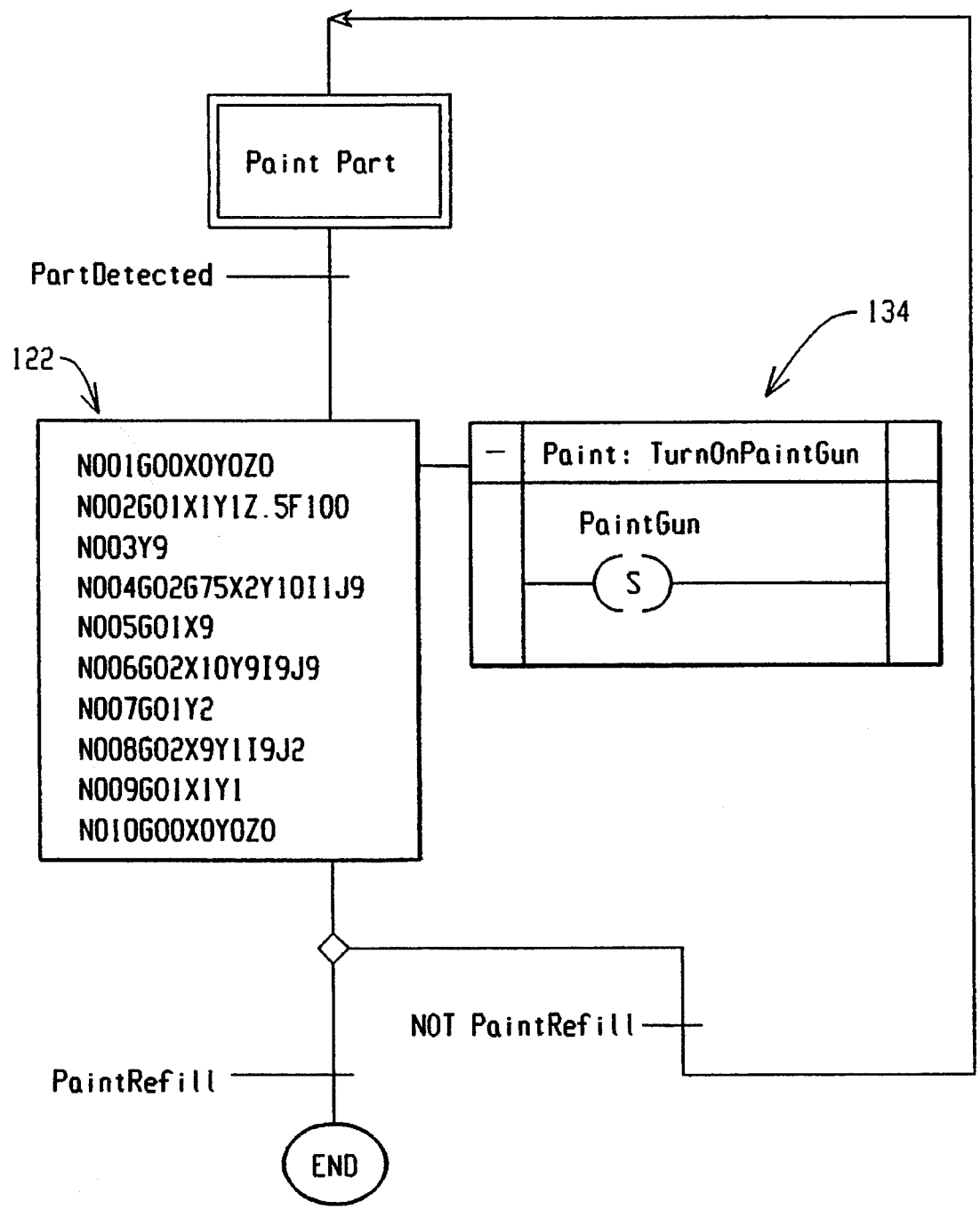
FIG. 9b shows the enhanced Sequential Function Chart of FIG. 9a with an open program window.
Figure 9C:
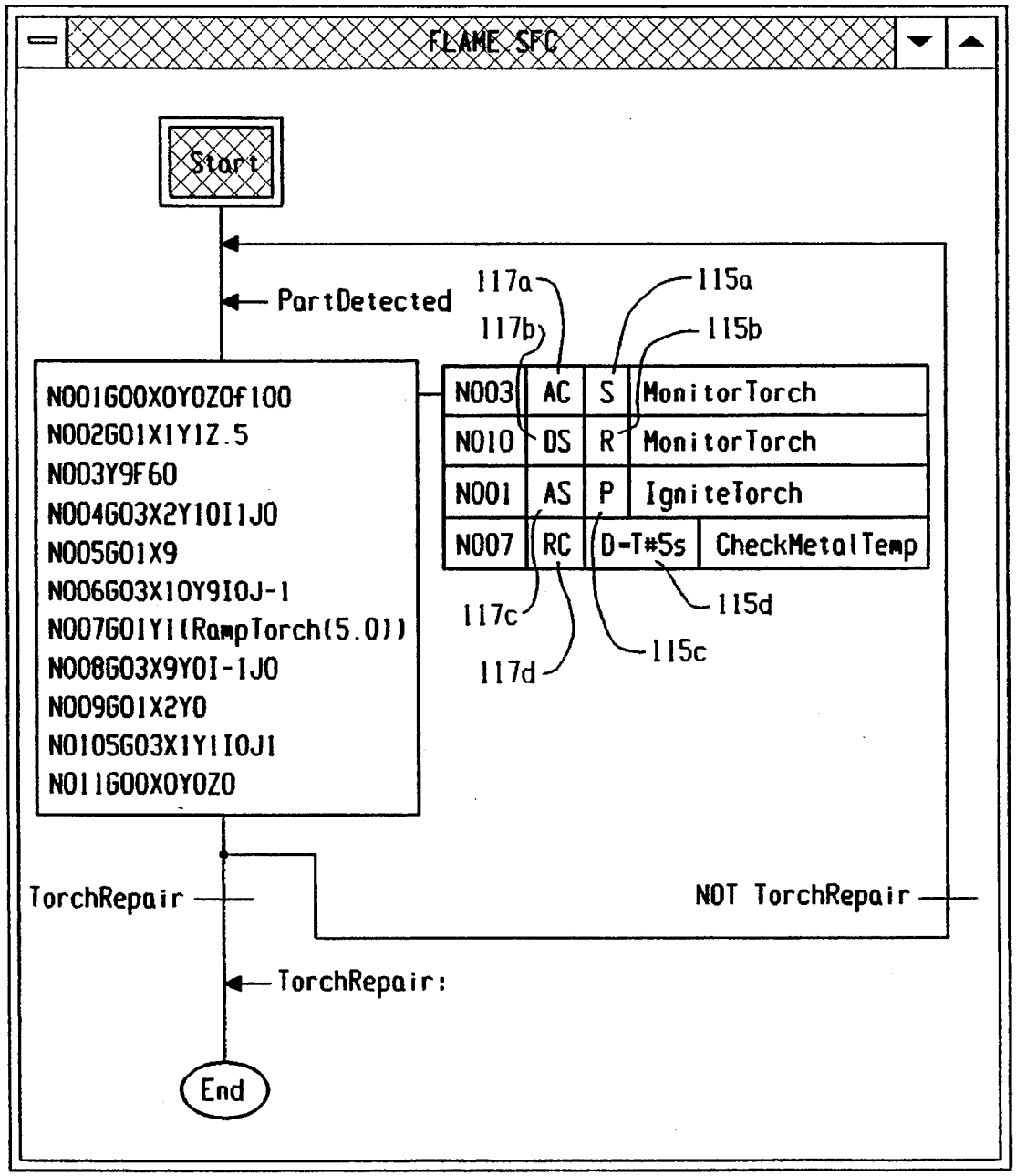
FIG. 9c shows a second enhanced Sequential Function Chart.

A solution to the above deficiencies of the prior art is to allow a series of sequential program statements 128 (e.g., RS-274D motion commands) to be placed inside the step boxes 122 (see FIGS. 9a, 9b and 9c). The sequential program statements appear prominently in the step boxes, and are not "buried" with the continuous programs. With such an enhanced SFC (also referred to as "SFC+") the sequential flow of execution inside of each step is easily visualized together with the sequencing between steps. The sequential program statements 128 begin executing one at a time when step box 122 is first activated. The sequencing of the sequential program statements within a step box is performed as an integral part of the execution of the step box and does not require the use of "done" boolean variables for each sequential program statement. Each sequential program statement is invoked only once and does not require the use of a "P" (execute once) type qualifier, as with the prior art standard SFC. A series of sequential program statements within a single step box are associated with the same set of continuous programs and exception handling actions. The continuous programs associated with a step box can either operate over the entire series of sequential program statements in a step box 122, or they can be started and/or stopped based on an association with a single sequential program statement through the use of program statement labels 118a, 118b that refer to labels on individual sequential program statements 128. The continuous programs are specified by continuous program names 132. Because of the above features the SFC+ is more compact and readable, than the standard Sequential Function Chart.

In a preferred embodiment of the present invention, the SFC+ is used to integrate sequential programs and continuous programs to form an application program. It should be noted that the term "application program" refers to the program combining both the sequential program(s) and continuous program(s). It may take the form of a diagram (e.g., SFC+) or pure text (e.g., Structured Text). The SFC+ of the present invention follows the rules specified in IEC-1131 standard for implementing sequenced continuous programs. However, the standard Sequential Function Chart is enhanced in several respects to create the SFC+ of the present invention. In this respect, sequential programs are embedded in step boxes to control application program sequencing. The sequential programs can be written in any programming language familiar to the industry segment of the application. Sequential programs are executed in order, one statement at a time, while continuous programs are executed repeatedly on a regular time interval (scanned). Furthermore, constructs for synchronizing sequential programs with continuous programs (including motion and process control synchronization) are provided. In addition, application exception processing functions are added to the continuous programs.

When a step box is initially activated (i.e., ready for execution) in the SFC+, a Program Execution subsystem will first scan all of the continuous programs associated (i.e., linked) with that step. The Program Execution subsystem will be described in greater detail below. After the first scan of the continuous programs, the continuous programs will be scanned on a regular specified time interval. After the continuous programs have been scanned once, the first program statement of the sequential program contained in the active step box will begin execution. When the first statement of the sequential program is complete, the second statement will begin executing and so on, until the last sequential program statement of the currently active step has been completed. When the last statement of the currently active step has been completed, the transition logic following that step will be activated. Any continuous program(s) associated with the currently active step will continue to be scanned until the transition logic becomes TRUE. When the transition logic becomes TRUE, the step is deactivated and the next step in the SFC+ is activated.

The present invention also provides a mechanism for synchronizing sequential program statements inside of the step box with continuous programs inside of an associated action box. To this end, synchronization qualifiers have been introduced, as shown in FIGS. 9a and 9c. The synchronization qualifiers 116a, 116b, 117a, 117b, and 117c relate to motion control, while synchronization qualifier 117d relates to process control. However, it is appreciated that other synchronization qualifiers beyond these illustrated may relate to other sequential functions.

Figure 11:
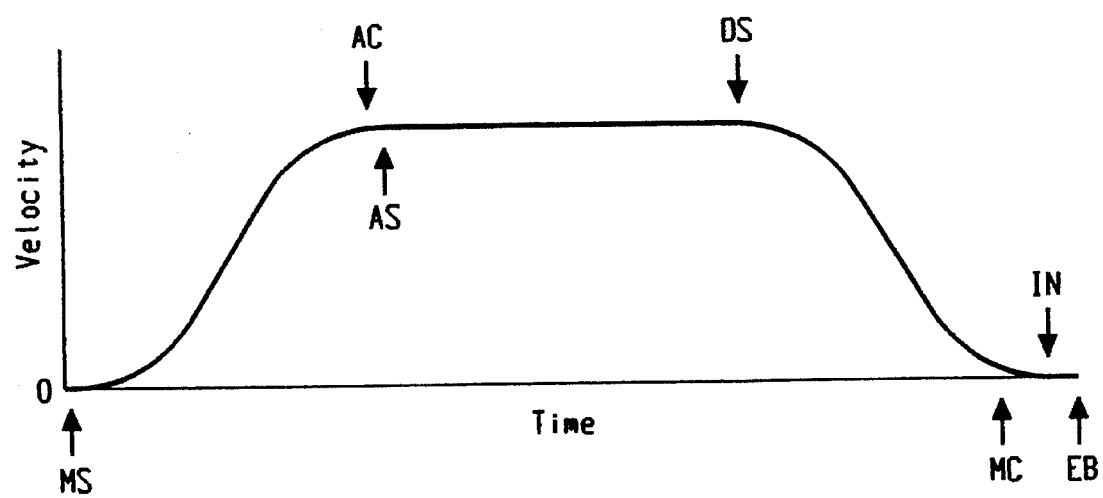
FIG. 11 shows the order of synchronization qualifiers on a velocity/time graph for a typical motion control application.

Synchronization qualifiers relating to motion control include motion started (MS), acceleration complete (AC), at speed (AS), deceleration started (DS), motion complete (MC), motion in position (IN) and end of block (EB). See FIG. 11. In step boxes which have multiple sequential program statements, a program statement label is used to associate a continuous program with the sequential program statements. For example, in the RS-274-D motion control language the N sequence number is used as a program statement label (label 124). These synchronization qualifiers can be combined with standard action qualifiers, such as action qualifiers 114 and 117. The continuous program specified by a continuous program name will begin scanning, as specified by the associated action qualifier, after the sequential program statement specified by the program statement label has met the condition of the associated synchronization qualifier.

Each time a continuous program is scanned, the Program Execution subsystem checks for synchronization with the sequential program. If qualifiers are attached to the continuous program, the Program Execution subsystem will check the status of the sequential program within the step (including any motion and/or process control status) to see if the continuous program will be scanned.

Referring now to FIG. 9c, the "continuous" MonitorTorch program will begin scanning, as specified by the action qualifier (S) 115a (STORED), after the sequential program statement which follows the program label N003 has reached its acceleration complete (AC) point as indicated by synchronization qualifier 117a. The MonitorTorch program will stop being scanned, as specified by the action qualifier (R) 115b (RESET), after the sequential program statement which follows the program label N010 has reached its deceleration started (DS) point as indicated by synchronization qualifier 117b. The IgniteTorch program will scan once, as specified by the action qualifier (P) 115c (PULSE), after the program statement which follows the program label N001 has reached its at speed (AS) point indicated by synchronization qualifier 117c. The CheckMetalTemp program will begin scanning, as specified by the action qualifier (D=T#5s) 115d (DELAY), 5 seconds after the process control ramp function which follows the label N007 has reached its ramp complete (RC) point, as indicated by synchronization qualifier 117d.

Referring now to FIG. 9a, the "continuous" TurnOnPaintGun program will scan once, as specified by the action qualifier (P) 114a, after the action statement which follows the program label N003 has reached its acceleration complete (AC) point as indicated by synchronization qualifier 116a. The "continuous" TurnOffPaintGun program will scan once as specified by the action qualifier (P) 114b (PULSE) after the program statement which follows the program label N009 has reached its deceleration started (DS) as indicated by synchronization qualifier 116b. The "continuous" CheckPaintFlow program will scan continuously while the step box 122 is activated, as specified by the absence of any action or synchronization qualifiers.

FIGS. 9a and 9b provide an example of the present invention as used in an application to paint a car body. This example illustrates the importance of controlling an application program with a sequential program and illustrates why it is necessary to synchronize continuous programs with the sequential programs.

Referring now to FIG. 9a, a series of sequential program statements 128 in step box 122 provide the instructions to control the movement of a painting mechanism through a process for painting a car body. Program statements 128 are written in RS-274-D. which is an industry standard language for programming motion. It will be appreciated that program statements 128 could be written in other programming languages such as BASIC, Fortran and C. Program statements 128 are located in a step box 122, occupying a dominant position in the SFC+ and controlling the sequence of the "PaintPart" application program.

Continuous programs which turn the paint gun on, turn the paint gun off, and check the paint flow are linked to step box 122 using continuous program names 132a, 132b, 132c, respectively, which are displayed in action statements box 126. Synchronization qualifiers 116a, 116b; program statement labels 118a, 118b; and action qualifiers 114a, 114b are also associated with the program names 132 in action box 126.

The continuous program named "TurnOnPaintGun" will be scanned once to turn the paint gun on when the program statement following the N003 program label reaches its acceleration complete point (the beginning of the painting motion). The continuous program named "TurnOffPaintGun" will be scanned once to turn the paint gun off when the program statement following the N009 program label reaches its deceleration started point (the end of the painting motion). Turning the paint gun on when the motion acceleration is complete at the beginning of the painting motion and turning the paint gun off when the motion deceleration begins at the end of the painting motion allows paint to be smoothly laid on the car body surface without leaving any paint blotches. The continuous program named "CheckPaintFlow" will be scanned continuously while step box 122 is active to ensure that the paint is flowing smoothly during the entire paint cycle. If a problem is detected in the paint flow, the CheckPaintFlow program will execute the "transition" function to force the SFC+ into a new step which handles paint gun cleaning and refill.

The contents of the continuous program can be viewed along with the sequential program by activating the continuous program name 132 in the associated action box 126. The continuous program is displayed in a program window 134 to the right of step box 122, as shown in FIG. 9b. With program window 134 open, the user can edit and debug the continuous program and the sequential program at the same time. The status of both programs is displayed by highlighting the active sequential program statement and highlighting the active elements of the continuous program (e.g., the active rung elements of the Relay Ladder Logic Network).

Sequential programs may be written using any sequential programming language (e.g., Structured Text, Basic, and RS-274-D). Also, application icons can be created to represent sequential program statements which perform some common application function in the industry. Continuous programs can be programmed using any traditional programming language, such as Relay Ladder Logic or Function Block Networks.

Figure 7:
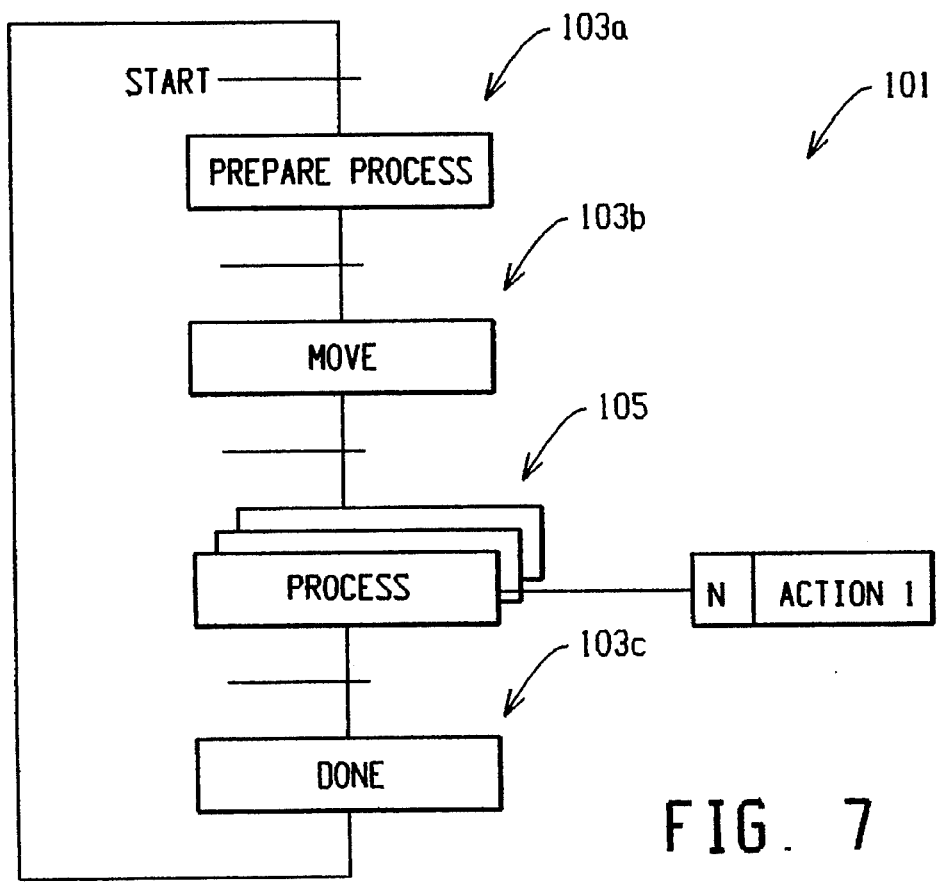
FIG. 7 is an example of an enhanced Sequential Function Chart in a top level format, and including a macro step name.

Referring not to FIG. 7, a preferred embodiment of the present invention provides means for displaying a simplified, concise, and compact view of an SFC+ diagram. In this respect, each SFC+ step box may be given a name. This name may be user defined, or be a default label name generated by the Logic Editor. The SFC+ shown in FIG. 7 is described as being in a "top-level" format. Step name boxes 103a, 103b, 103c refer to regular steps in a SFC+ diagram. Macro step name box 105 refers to a macro step in a SFC+ diagram. A macro step is represented by nested boxes in a top-level format SFC+.

A macro step is an SFC+ step which invokes at lease one child SFC+. The child SFC+ is executed when the macro step is executed. Like any other step, a macro step can have actions associated with it which are scanned while the child SFC+ program is executed.

When the macro step of macro step name box 105 is activated, the Program Execution subsystem spawns off a new instance of the SFC+ execution mechanism to execute a child SFC+. The SFC+ execution mechanism consists of a traditional state machine implementation well known to those skilled in the art. The child SFC+ is executed in place of the macro step in the parent SFC+. While the Program Execution subsystem is executing the child SFC+, the Program Execution subsystem will also scan any actions in the parent SFC+ which are attached to the macro step name box 105 and the Program Execution subsystem will also continue executing any SFC+ steps in the parent SFC+ which are activated in parallel with the macro step. When the child SFC+ completes execution, the Program Execution subsystem destroys the instance of the SFC+ execution mechanism associated with Macro Step Box 105 and activates the next step in the parent SFC+ (step name box 103c).

Figure 25:
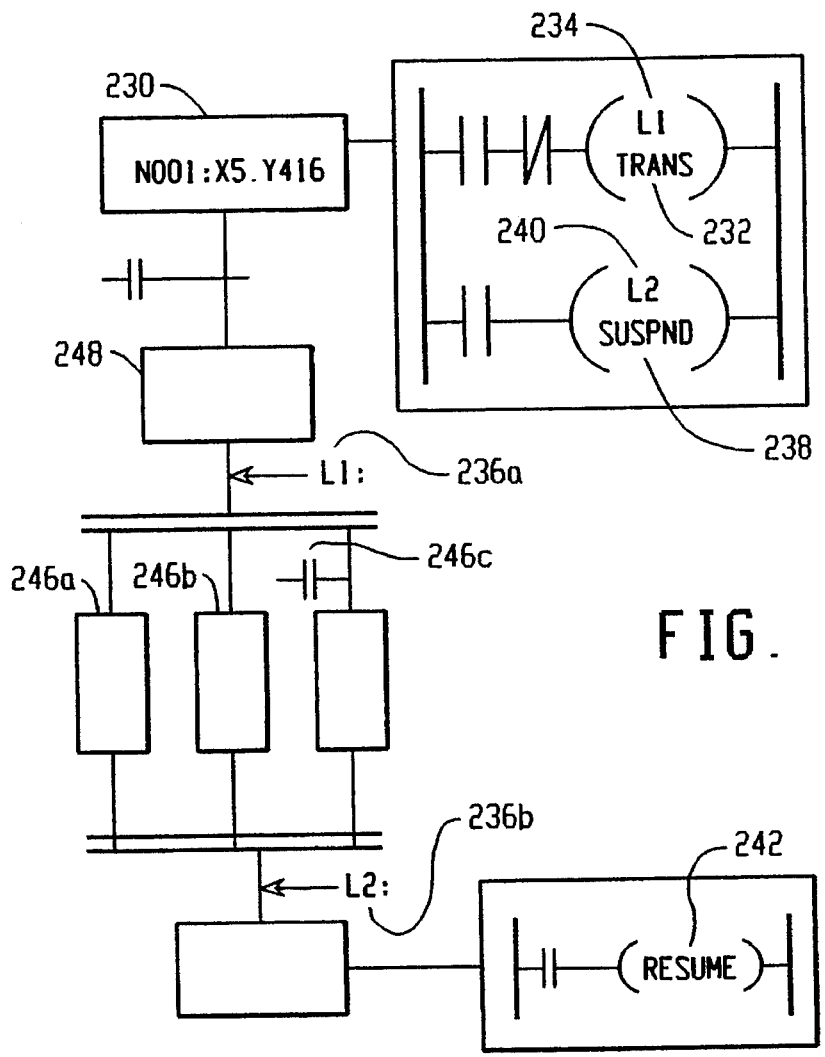
FIG. 25 shows an enhanced Sequential Function Chart having exception handling.

Referring now to FIG. 25, enhancements have been made to the IEC-1131 standard for an exception handling mechanism to allow continuous programs to force an immediate stale transition in the SFC+ based on a detected condition. By adding a new SFC+ transition output coil ("trans") 232 to the repertoire of the continuous program, the continuous program can force a transition to another step by activating this coil. Transition output coil 232 includes a label identifier 234 referring to a destination location 236a in the SFC+ to transition to when coil 232 is "energized."

The transition output coil "trans" 232 is represented in the list of elements available to a continuous program like any other output logic coil conforming to the IEC-1131 standard. It contains the term "trans" (representing an SFC+ transition) between two parenthesis. When a transition output coil is inserted into a Relay Ladder Logic Network, the user must specify a destination location 236a as the transition destination. A label identifier 234 is placed above the transition output coil representation in the Relay Ladder Logic Network.

When transition output coil 232 is energized during program execution, any step box that refers to the action statement box that contains activated transition coil 232 is immediately deactivated, and any active sequential program statements in these deactivated step boxes are immediately aborted. The step boxes immediately following transition destination location 236a referred to by transition output coil 232 are activated. If a transition statement follows transition destination location 236a, then the transition statement (i.e., transition statement 246c) is enabled to be scanned as if step box 248 preceding the transition statement has just been completed.

Additionally, other coil elements are added to the repertoire of the continuous program which allow continuous programs to suspend the operation of active steps in a SFC+, force a temporary transition to a new step in the SFC+, and later transition back to the original active steps, resuming their operation where the functions had been suspended.

In a preferred embodiment of the present invention, two additional output coils (i.e., suspend output coil 238 and resume output coil 242) are added to the list of logic elements available in the Relay Ladder Logic Network. This functionality is useful in applications where normal operations may need to be suspended and corrective action taken when certain conditions occur. Furthermore, normal operations can be continued after the corrective action sequence is completed. One example use of this feature is the changing of a metal cutting tool if it becomes dull or broken using a sequence of actions that will move the machine automatically away from the part being machined to a position where the tool can be exchanged, change the tool, and then return back to machining the part.

The suspend ("suspnd") and resume ("resume") output coils are represented in the list of elements available to a continuous program like other output coils. The "suspnd" output coil. 238 contains a reference to an SFC+ label identifier 240 above it. The "resume" output coil 242 does not contain a label identifier since the SFC+ will transition back to the most recent suspension point in step box 230.

When "suspnd" output coil 238 is activated, the active program statements in step box 230 associated with the action containing the energized "suspnd" output coil 238 will be placed into a paused state. Furthermore, any active sequential program statements in the paused step boxes receive a pause command which will cause them to perform a predefined action that will stop the executing function, such as decelerating all motors to a stop. The suspended sequential program statements are stored and are placed in a list of suspended steps. Execution continues from destination location 236b specified by the "suspnd" coil 283. When the "resume" coil 242 is activated, the program statements that are associated with the energized "resume" output coil 242 will be deactivated, and the step box on the suspended steps list will be reactivated at the point where the sequential program statements were suspended and continue operation from that point.

Figure 8:
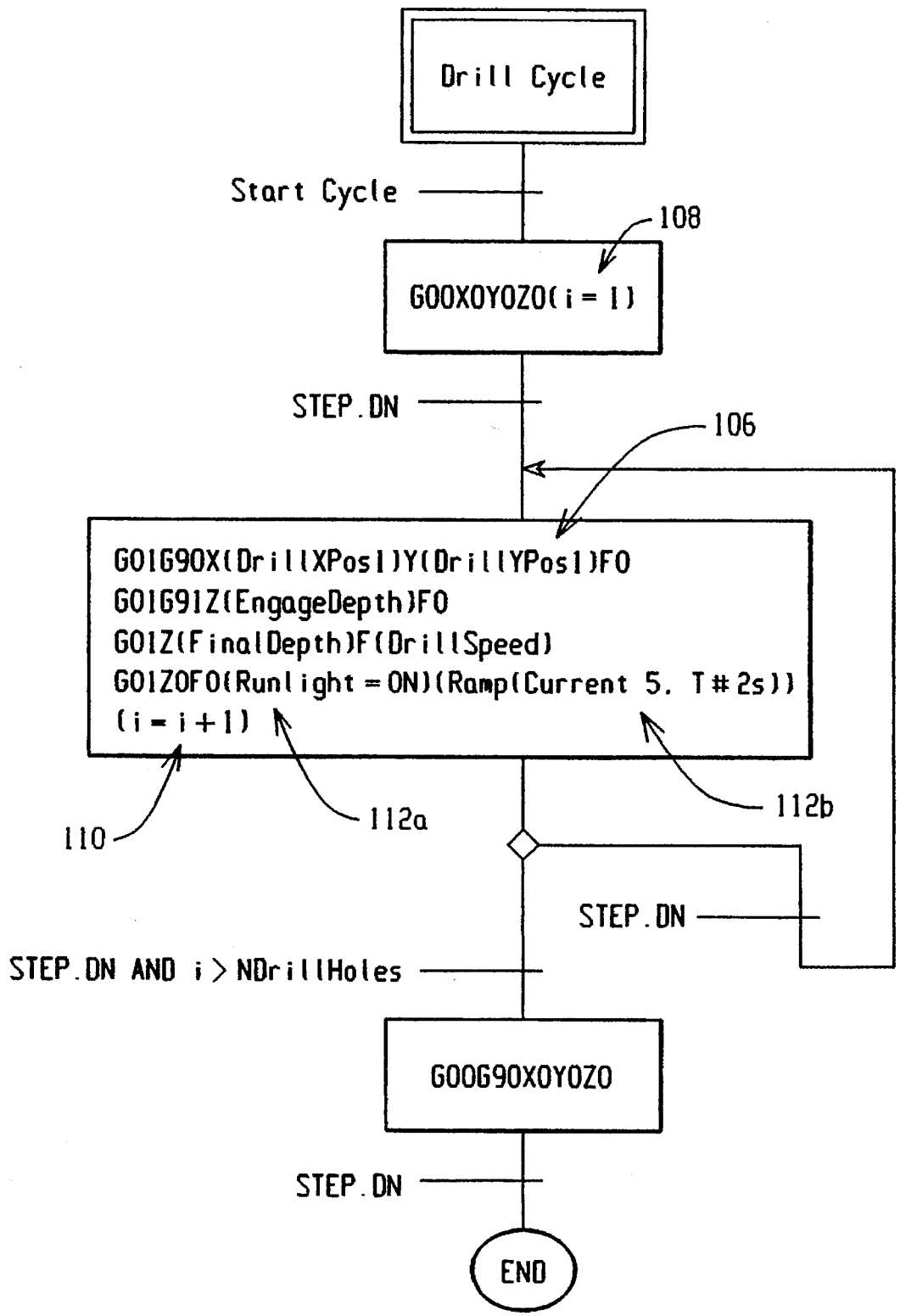
FIG. 8 is an example of an enhanced Sequential Function Chart having embedded RS-274D commands and IEC-1131 Structured Text (ST) commands.

In motion control applications RS-274-D is often the preferred sequential programming language because it is used on almost all CNCs and has been a standard on the factory floor for many years. Another object of the invention is to use Structured Text (ST) expressions and Structured Text assignment statements in combination with RS-274-D motion commands to allow the RS-274-D motion commands to be parameterized as shown in FIG. 8. Structured Text assignment statements can be interspersed with RS-274-D motion commands by enclosing the statement in parenthesis and including it as part of an RS-274-D motion command, or they can stand alone as separate statements. It will be appreciated that other programming languages such as BASIC, Fortran and C can also be used in conjunction with RS-274D commands. A Structured Text expression is embedded in an RS-274-D command by replacing the numeric element of the standard RS-274-D motion command with a Structured Text expression in parenthesis. For example, Structured Text expression 106 replaces a numeric element in an RS-274-D motion command. Structured Text assignment statement 108 is included as part of an RS-274-D motion command while Structured Text assignment statement 110 stands alone as a separate statement. Accordingly, Structured Text assignment statements can be used to synchronize I/O (as indicated at 112a) and process control set points (as indicated at 112b) with RS-274-D motion commands.

A preferred embodiment of the present invention allows the development of application specific sequential program statements using a Logic Editor (which will be described in detail below). This is accomplished by combining one or more sequential program statements (e.g., program statements for motion and/or process control) and associating a unique name to that set of sequential program statements (e.g. see FIG. 12, "Hard Stop"). Furthermore, a graphic icon can be attached to that set of sequential program statements to provide a visual indicator. The graphic icon can be used in any step box to represent a defined set of sequential program statements.

Likewise, graphic icons can also be attached to continuous program statements to represent action statements (see FIG. 12, "Advnc Ctrr") and attached to transition logic statements associated with a step box.

Figure 14:
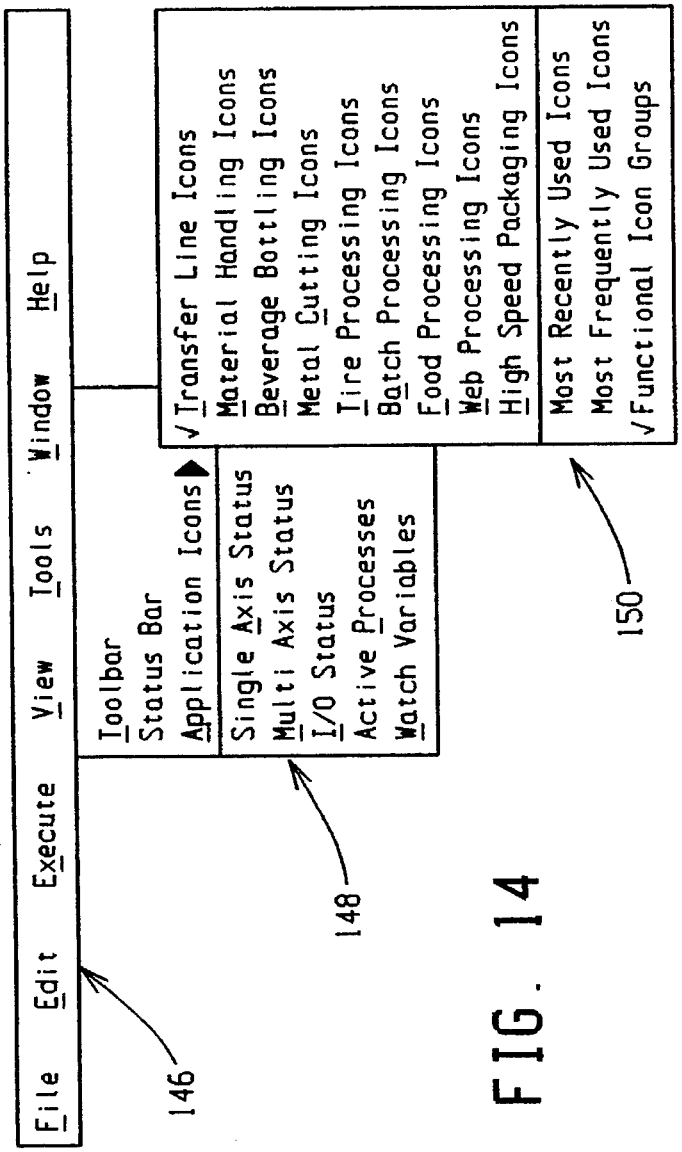
FIG. 14 shows a menu bar, a mode selection menu, and an icon group menu.
Figure 13:
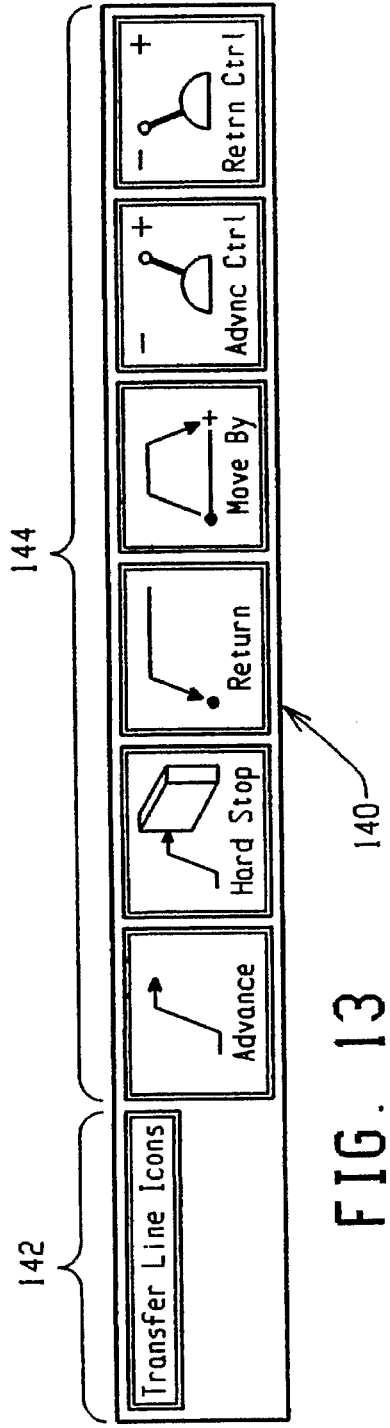
FIG. 13 shows an icon selection bar.

Referring now to FIG. 13, an icon selection bar 140 provides the user with simple means to select the icons which can be accessed in the Logic Editor. In this respect, the icons available for an application program are loaded into the Logic Editor by selecting the desired icon group from an icon group menu 150, shown in FIG. 14. As noted above, icons may represent sequential program statements, continuous program statements or transition logic statements.

Icon selection bar 140 contains an icon group label 142 and an icon set 144. The icons visible in icon set 144 are selected from the entire set of available icons either on the basis of the most recently used icons, the most frequently used icons, or the function of the icons. With respect to the latter, icons are arranged into functional groups and made visible on the icon selection bar 140 on the basis of the most recently used functional group. The icon set displayed in icon selection bar 140 is determined by the selection from icon group menu 150.

The icons visible in icon selection bar 140 can be directly added to the SFC+ by dragging the selected icon to the SFC+ using a pointing type user interface device. If the desired icon is not visible on the icon selection bar 140, the user activates icon group label 142 to browse through the entire list of available icons and to select a desired icon.

Figure 28:
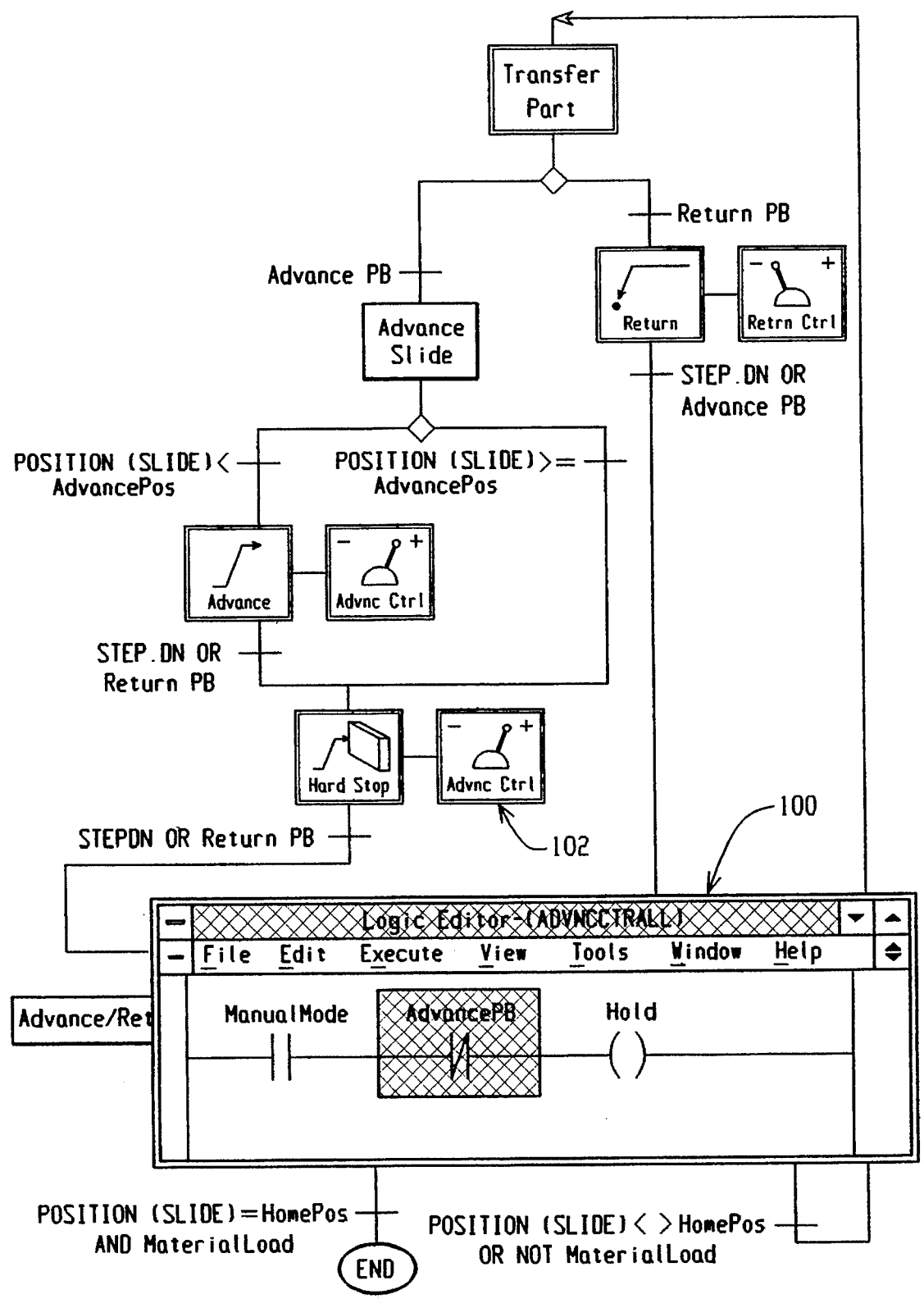
FIG. 28 shows an enhanced Sequential Function Chart having a pop-up Relay Ladder Logic window.

The Logic Editor is designed to make the switch between alternately editing the sequential program and editing the associated continuous program (e.g., an RLL Network) seem effortless, since these programs are closely related and may require simultaneous editing. A continuous program associated with a step can be viewed and edited by simply activating the desired action statements using a pointer type user interface. Referring to FIG. 28, an edit window 100 is laid on top of the SFC+ for viewing or editing.

Figure 15:
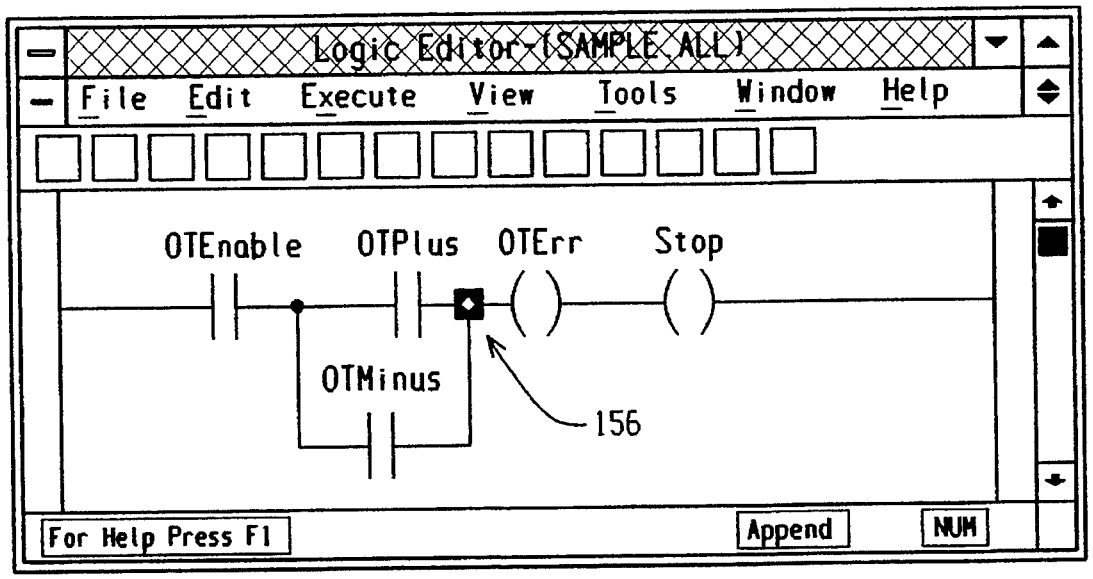
FIG. 15 shows a Relay Ladder Logic (RLL) Network in the Logic Editor.

A preferred embodiment of the present invention also provides an improved ladder logic editor to simplify the programming of continuous programs. Referring to FIG. 15, visual connection symbols, (i.e., "hot spots") are added to branch connection points to simplify modification or rewiring of Relay Ladder Logic Networks. A hot spot can be selected and moved to another location using a pointing type user interface device. "Hot spots" are used to specify a particular location in a Relay Ladder Logic Network. Accordingly, a hot spot is used to specify a point in the network where a connection is desired, or a point in the network where a disconnection is desired. Hot spot 156 is moved from a first position shown in FIG. 15 to a second position shown in FIG. 16. Accordingly, the connection of "OTMinus" is modified.

Figures 17, 18:
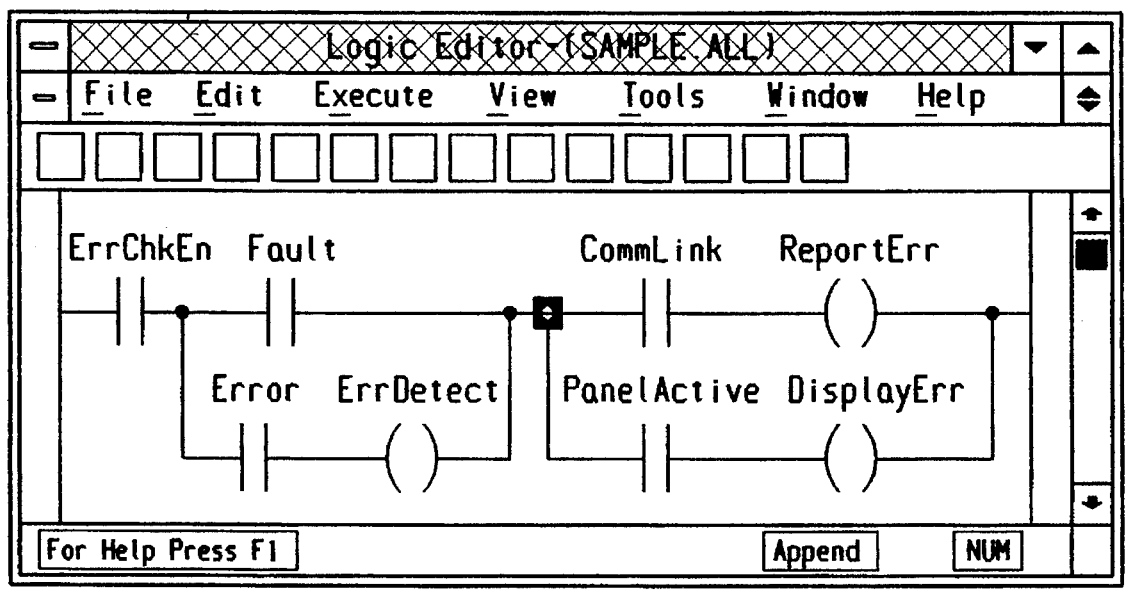
FIG. 17 is a IEC-1131 Structured Text (ST) program including an Instruction List (IL) program for the RLL Network of FIG. 16.
FIG. 18 is an enhanced Relay Ladder Logic Network having multiple logical outputs.

A further feature of the present invention allows output elements and Function Blocks to be placed anywhere in a Relay Ladder Logic Network as shown in FIG. 18. Accordingly, a preferred embodiment of the present invention uses a unique algorithm to evaluate the Relay Ladder Logic Network. The algorithm will be discussed in detail below in connection with the Program Execution Subsystem.

Figure 19:
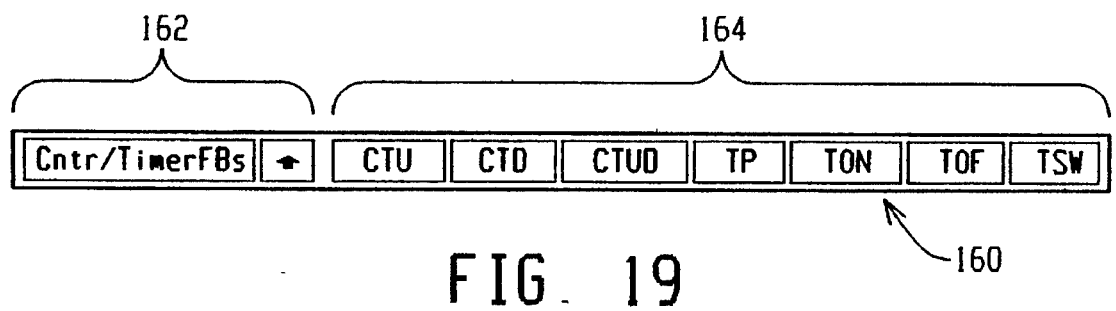
FIG. 19 shows a function block selection bar.
Figure 20:
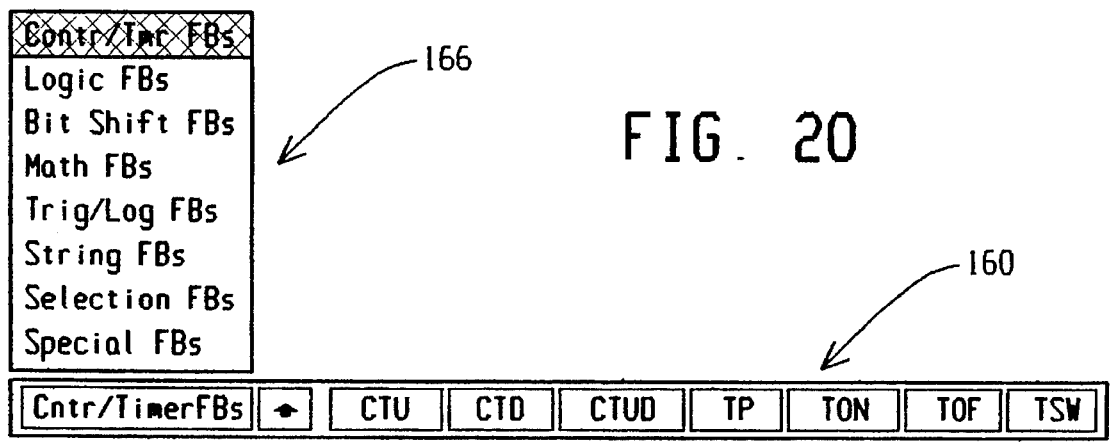
FIG. 20 shows the function block selection bar of FIG. 19 with an activated function block group menu.

Referring to FIGS. 19 and 20, a preferred embodiment of the present invention includes a function block selection bar 160. Function block selection bar 160 simplifies the selection of a function block from a large list of available function blocks. Function block selection bar 160 includes a function block group list button 162 and a function block button set 164. The function blocks which can be accessed through function block selection bar 160 are organized into functional groups. When a functional group is active (e.g., Counter/Timer Function Blocks), function block button set 164 displays the function blocks which are contained in that group. Function block group menu 166 allows the user to select a new function block button set from the list of available functional groups. The function blocks displayed in function block button set 164 can be directly added to a Relay Ladder Logic Network by dragging a function block corresponding to a selected function block button onto a Relay Ladder Logic Network diagram using a pointing type user interface device. For example, function block 168 is placed into the Relay Ladder Logic Network diagram of FIG. 21.

Figure 22:
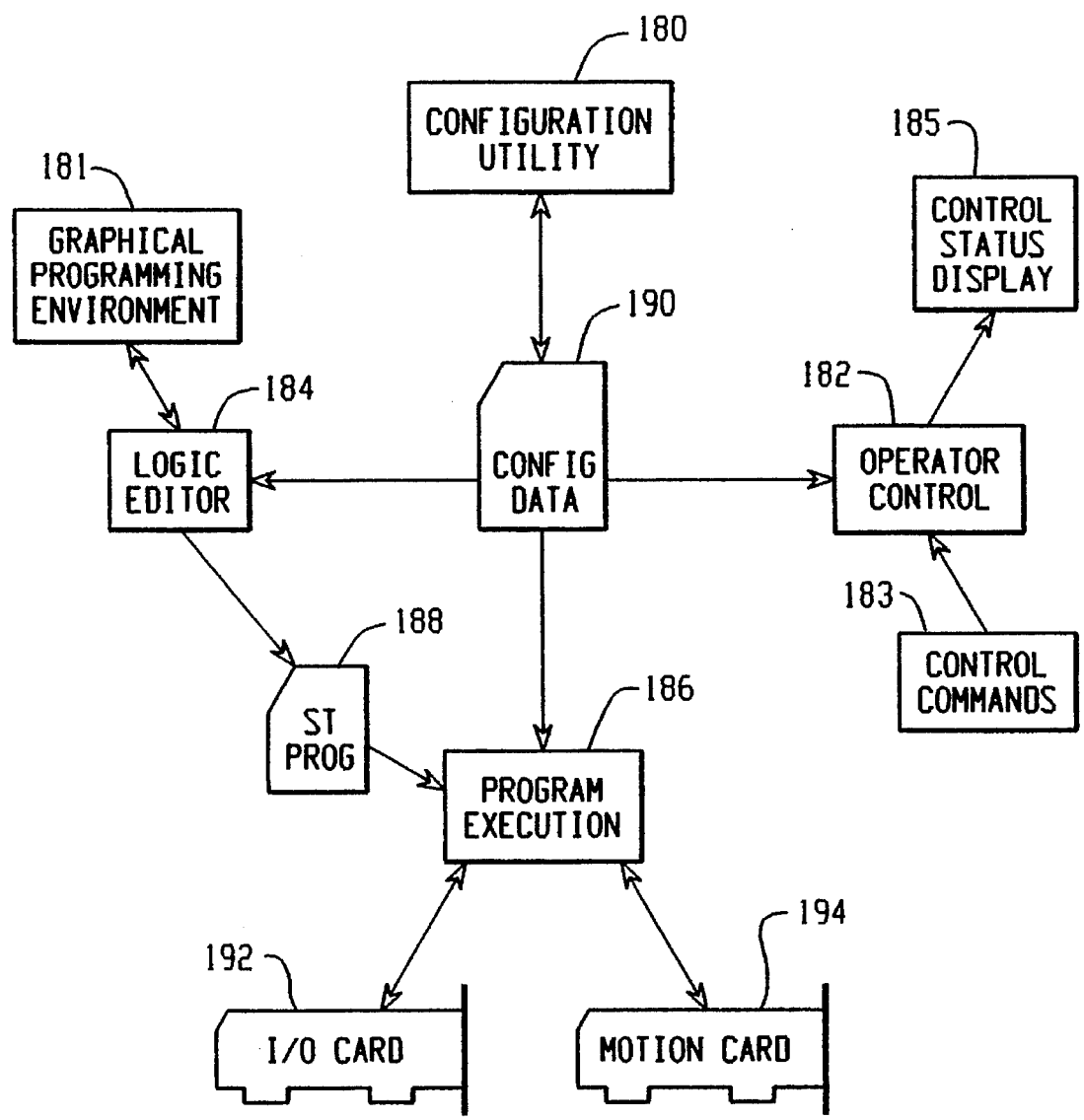
FIG. 22 is a data flow diagram showing the major subsystems that comprise a preferred embodiment of the present invention.

A preferred embodiment of the present invention comprises four major subsystems, as shown in FIG. 22. It will be appreciated that while the preferred embodiment shown in FIG. 22 is described in connection with motion control, the subsystems of the present invention may be used in connection with other types of industrial automation controls well known to those skilled in the field of industrial automation. These subsystems include Configuration Utility 180, Operator Control 182, Logic Editor 184, and Program Execution 186. FIG. 25 shows an entity relationship diagram showing the data architecture model used by Configuration Utility 180 of FIG. 22. Program Execution 186 interprets Structured Text (ST) programs 188, originating from Logic Editor 184 and control commands 183 (e.g., RUN, STOP and HOME), originating from operator control 182. On a periodic time interval, Program Execution 186 reads status from, and writes outputs and commands, to I/O card 192 and motion control card 194. Configuration Utility 180 is used by an application engineer to define the hardware configuration (e.g., the type of input and output interface cards), the logical assignment of the I/O linking physical I/O to symbolic names used in application programs, and motion application parameters (e.g., servo control loop gains, velocity limits, acceleration limits and position travel limits). Logic Editor 184 provides a combination of graphical and textual programming paradigms to define the application program for the target application. Operator Control 182 provides a real-time control status display 185 to the operator and routes operator control commands 183 to Program Execution 186.

CONFIGURATION UTILITY SUBSYSTEM

Configuration Utility 180 is used by the application engineer to: (1) identify which system hardware components are present, (2) identify how these hardware components are configured, and (3) assign application specific symbolic names to the hardware components and physical I/O addresses. These application specific symbolic names can be used in the application program in place of the physical I/O addresses or location of the hardware components and interfaces. Configuration data is converted into a binary format and stored to a data file on hard disk 74. The binary data file is used by the other subsystems to convert application specific symbolic names to physical I/O addresses. This configuration data also contains information necessary to configure and operate cards 84, 86, 88 and 92.

OPERATOR CONTROL SUBSYSTEM

Operator Control 182 provides a display for: (a) controlling the operation of the industrial automation machinery and (b) providing diagnostic and status information to the user for troubleshooting problems that might occur.

LOGIC EDITOR SUBSYSTEM

Logic Editor 184 provides an integrated graphical programming environment 181 for the user to develop the SFC+. In a preferred embodiment of the invention, the entire graphical program representation is maintained in an internal format. The internal format contains information such as type, size, and location of graphical elements. This internal format is generated using methods well known to those experienced in the art of designing graphical editors.

In the preferred embodiment of the SFC+, the step boxes are represented in one of the following ways:

(a) default labels consisting of the word "step" followed by an ascending number such as step1, step2, step3 and so on, assigned to the SFC+ step by Logic Editor 184.

(b) user defined labels such as "Transfer Part," "Advance Slide," or "Paint Part" as specified to Logic Editor 184 by the user.

Figure 12:
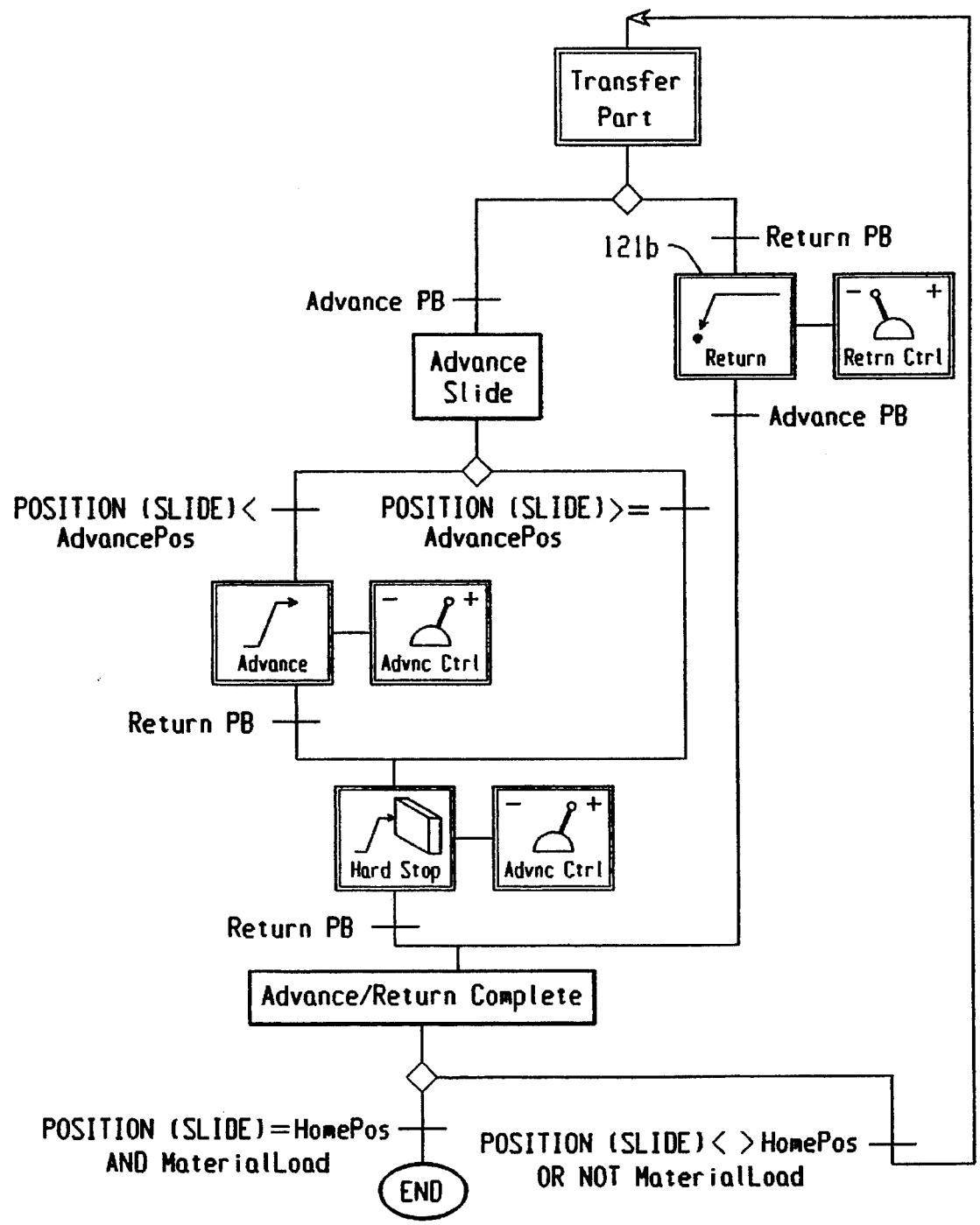
FIG. 12 shows an enhanced Sequential Function Chart having icons in place of step boxes and action statement boxes.

(c) user-specified graphical icons such as the ones depicted in FIG. 12.

(d) The sequential program statement(s), such as RS-274-D program statements as shown in FIG. 9, associated with the step as pre-packaged or user defined programs.

For (a), (b) and (c), the labels or icons can either be used as a label with no associated sequential program or as a short hand for a sequential program, written in RS-274D, IEC-1131 Structured Text or similar languages, which is represented by the label or the icon.

It should be appreciated that utilizing application specific terminology for user defined labels and user specified icons can make the programming and operation of the control significantly easier for the user. In particular, a set of graphical icons representing application specific sequential or continuous programs, such as the ones most commonly used in transfer line applications (see FIG. 12) make the programming and monitoring of an application program much simpler.

When application specific programs are created they are stored in a file which is identified with the application and can be reused later by name or icon in any SFC+. To facilitate the selection of icons representing application specific programs (i.e. "application icons") for an SFC+, the Logic Editor displays icon selection bar 140, shown in FIG. 13. When the application icons are loaded into the Logic Editor, an application icon file is opened and all of the application icons are read in from the file and stored in a list.

The application icons which are displayed on icon selection bar 140 are managed using one of three different mechanisms. The user chooses the mechanism to be used through icon group menu 150. The three mechanisms are: (1) selection based on functional icon groups, (2) selection based on most recently used icons, or (3) selection based on most frequently used icons. If the mechanism chosen is the selection based on functional icon groups, a scrollable icon display 152 is displayed with each functional group placed in a row (see FIG. 27). When a new icon is selected from the scrollable icon display 152, all of the icons in the functional group associated with that icon are displayed on the icon selection bar 140. If the mechanism chosen is selected based on most recently used icons, a list of the most recently used icons is maintained by Logic Editor 180 and those icons are displayed on icon selection bar 140. If the mechanism chosen is selection based on the most frequently used icons, a list maintained by Logic Editor 184 containing the number of times each icon was used is accessed. The list is sorted in descending order of usage and the icons at the top of the list are displayed on icon selection bar 140.

If the desired icon is visible on icon selection bar 140, the user can either select the icon or drag the icon to the desired location on the SFC+.

When the user drags an icon to a desired location, the icon is inserted where the user completes the drag operation. Logic Editor 184 keeps track of where each SFC step is located on the user display and the visual size of the step. When the drag operation is completed Logic Editor 184 searches through the list of SFC steps to find the insert target step (the step which the dragged icon will be inserted relative to). Once the drag target point is determined to be contained in a step area, the dragged icon is inserted relative to that step (i.e., the target step). If the drag target point is above the center of the target step, the dragged icon is inserted above the insert target step. If the drag target point is below the center of the target step, the dragged icon is inserted below the insert target step.

Figure 27:
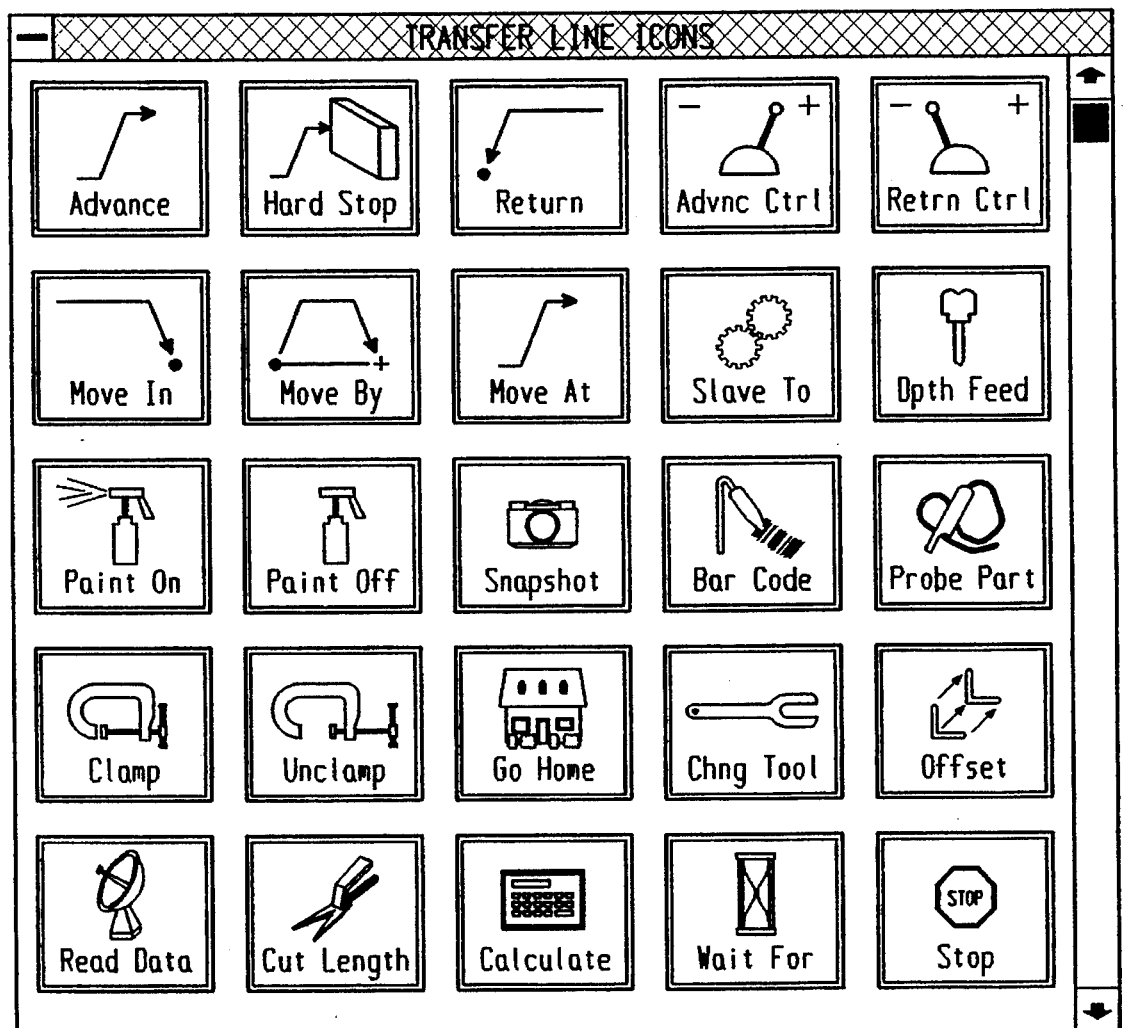
FIG. 27 shows several examples of application specific icons.

If the desired icon is not visible on icon selection bar 140, the user may activate icon group label 142. In response, Logic Editor 184 displays scrollable icon display 152 as shown in FIG. 27, which contains all of the application icons associated with the active application program. The user selects a desired icon from this display and the icon is inserted after the active edit step on the SFC+.

Figure 16:
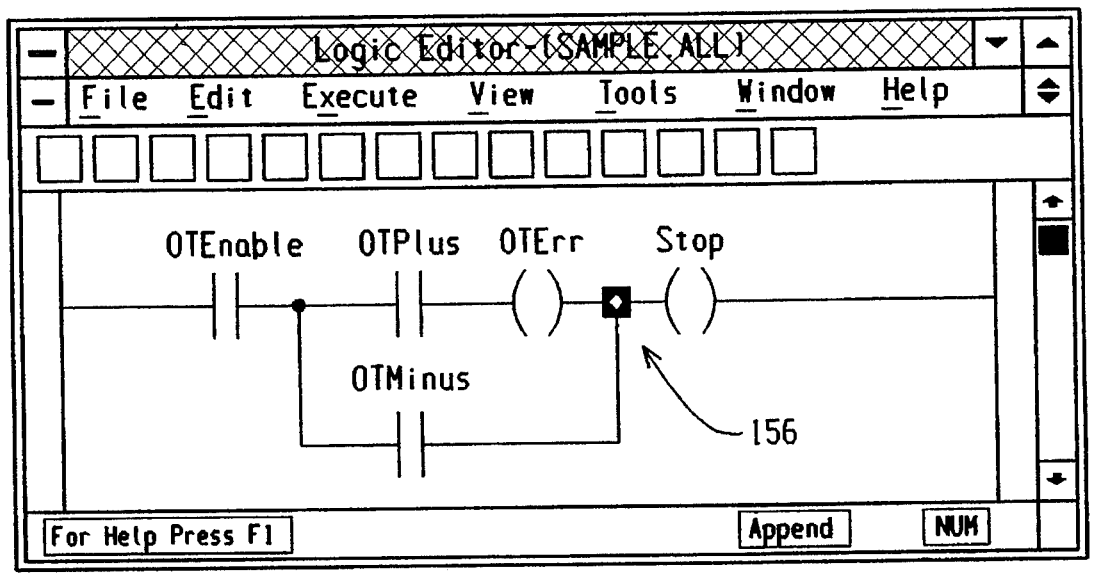
FIG. 16 shows the RLL Network of FIG. 15 with a revised branch connection point.

Referring now to FIGS. 15 and 16, in a Relay Ladder Logic Network, Logic Editor 184 visually identifies the point at which each parallel logic branch departs from the parent rung branch using a visual connection symbol (i.e., "hot spot"). To rewire the connection of a parallel logic branch from the current location to another position on the parent branch, a pointing type input device is used to drag the visual connection symbol from the current location to a desired location. The parallel logic branch is then reconnected to the parent rung at the drag completion point.

Logic Editor 184 keeps track of the position and size of all of the graphical elements in the Relay Ladder Logic Network. When a drag operation is initiated, Logic Editor 184 searches through the list of ladder logic elements to find the connection element to be rewired. Once the drag target point is determined to be contained in a connection element that connection element, is selected to be rewired. The connection element is then removed from its current position and inserted in the parent rung at the new position.

Referring to FIGS. 19 and 20, Logic Editor 184 displays function block selection bar 160 to facilitate the selection of function blocks to be included in a Relay Ladder Logic Network. If the desired function block is visible on function block selection bar 160, the user can either select the function block or drag the function block to the desired location in the Relay Ladder Logic Network.

If the user selects a function block, the function block is inserted after the active edit element in the Relay Ladder Logic Network. Logic Editor 184 keeps track of the active edit element and displays that element as highlighted. A new active element can be selected by using a pointing type input device.

Figure 21:
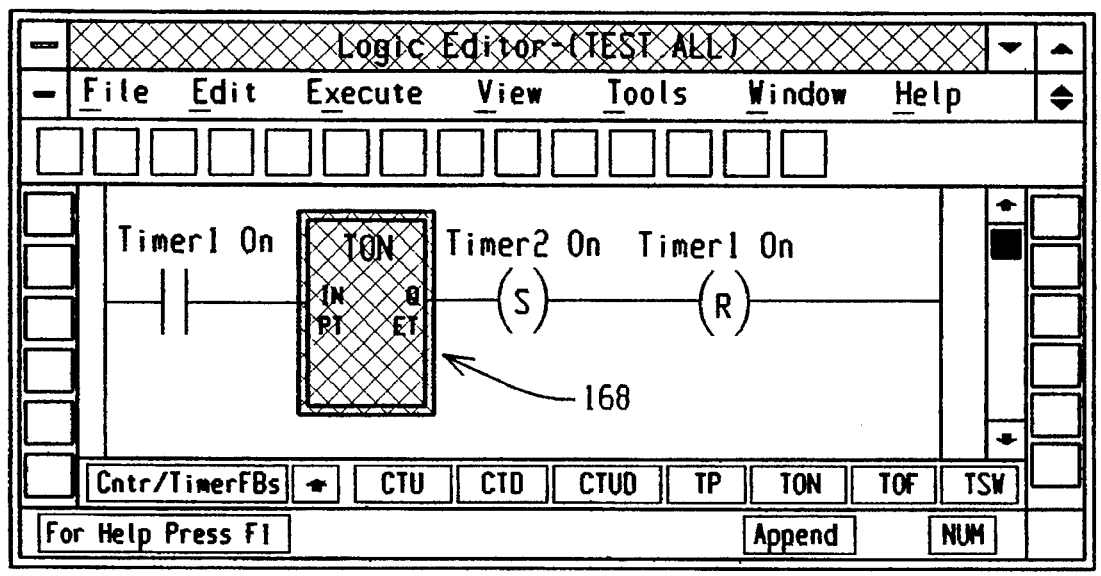
FIG. 21 shows a Relay Ladder Logic (RLL) Network including a Function Block element.

If the user drags a function block to the desired location, the function block is inserted where the user completes the drag operation, as shown in FIG. 21. If the desired function block is not contained in the active function block button set 164 of function block selection bar 160, the user activates function block group list 162. In response, Logic Editor 184 displays function block group menu 166 containing all of the function block groups (see FIG. 20). When the user selects a function block group from function block group menu 166, function block button set 164 is updated to display a new set of function blocks. The user can continue selecting function block groups until the desired function block group is displayed.

Logic editor 184 also performs the important function of converting the SFC+ into an ASCII Structured Text program 188. FIG. 17 illustrates the Structured Text program representation of the Relay Ladder Logic Network shown in FIG. 16. Structured Text program 188 is interpreted by program execution 186 to generate I/O commands to I/O card 192 and motion card 194. The operations performed by program execution 186 will be described in detail below.

FIG. 10 shows a Structured Text program which represents the SFC+ of FIG. 9A. When an SFC+ is converted to the ASCII Structured Text program 188, it is represented by a series of steps and transitions. Steps include any sequential program statements, continuous program names, action qualifiers, synchronization qualifiers and program statement labels. Transitions include any transition statements in the SFC+.

PROGRAM EXECUTION SUBSYSTEM

A module of Program Execution 186 is the program language interpreter. The interpreter interprets the ASCII Structured Text (ST) program 188, which can include sequential program statements (e.g., RS-274D motion commands). The interpreter uses methods well known to those experienced in the art of designing program language interpreters. The interpreter parses the program and invokes internal procedures that execute the functions of the program.

Figure 23A:
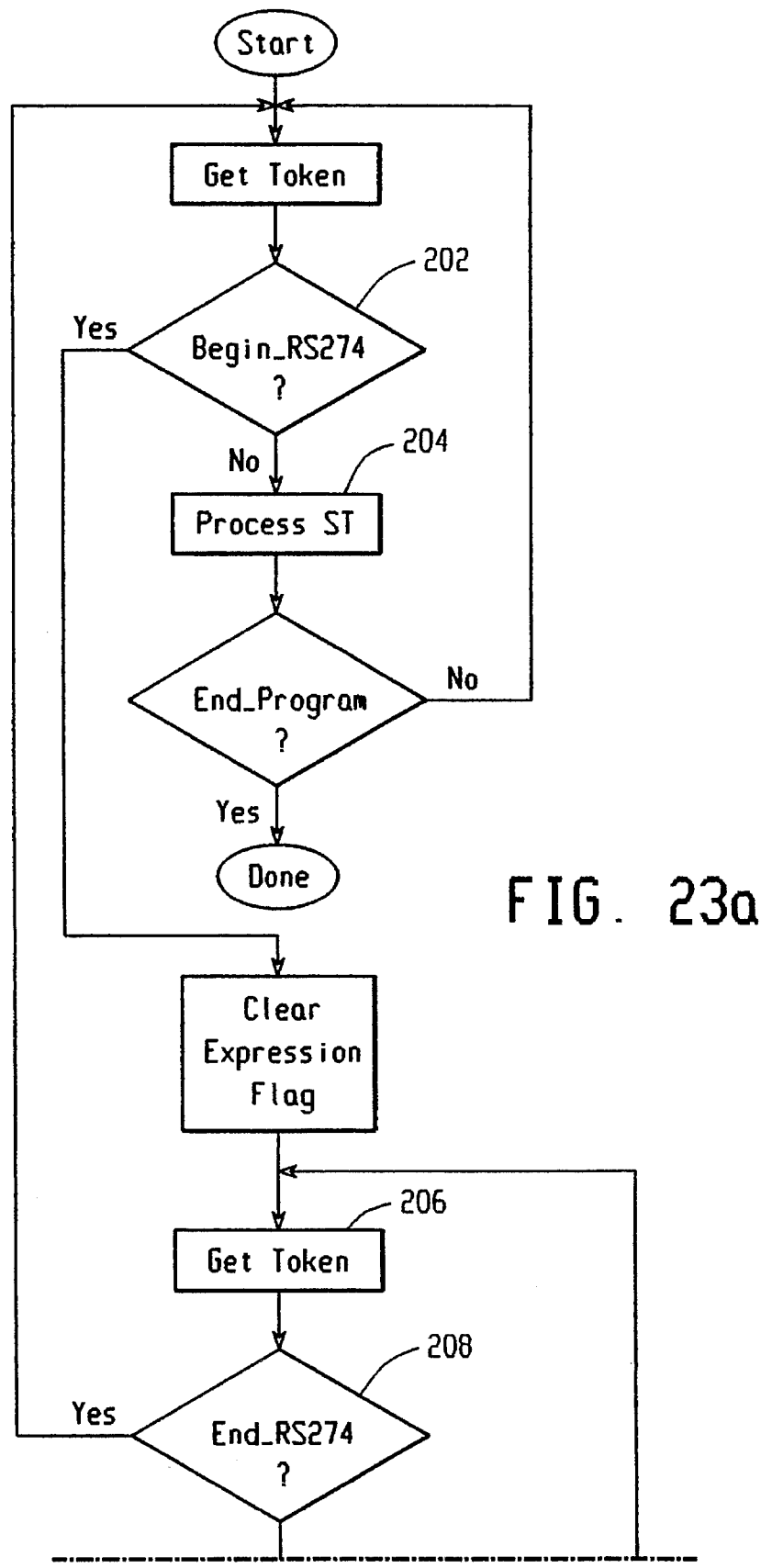
FIG. 23 is a flow chart showing the process used by the present invention to decode RS-274D commands embedded within Structured Text programs, and Structured Text expressions and Structured Text assignment statements embedded within RS-274D commands.
Figure 23B:
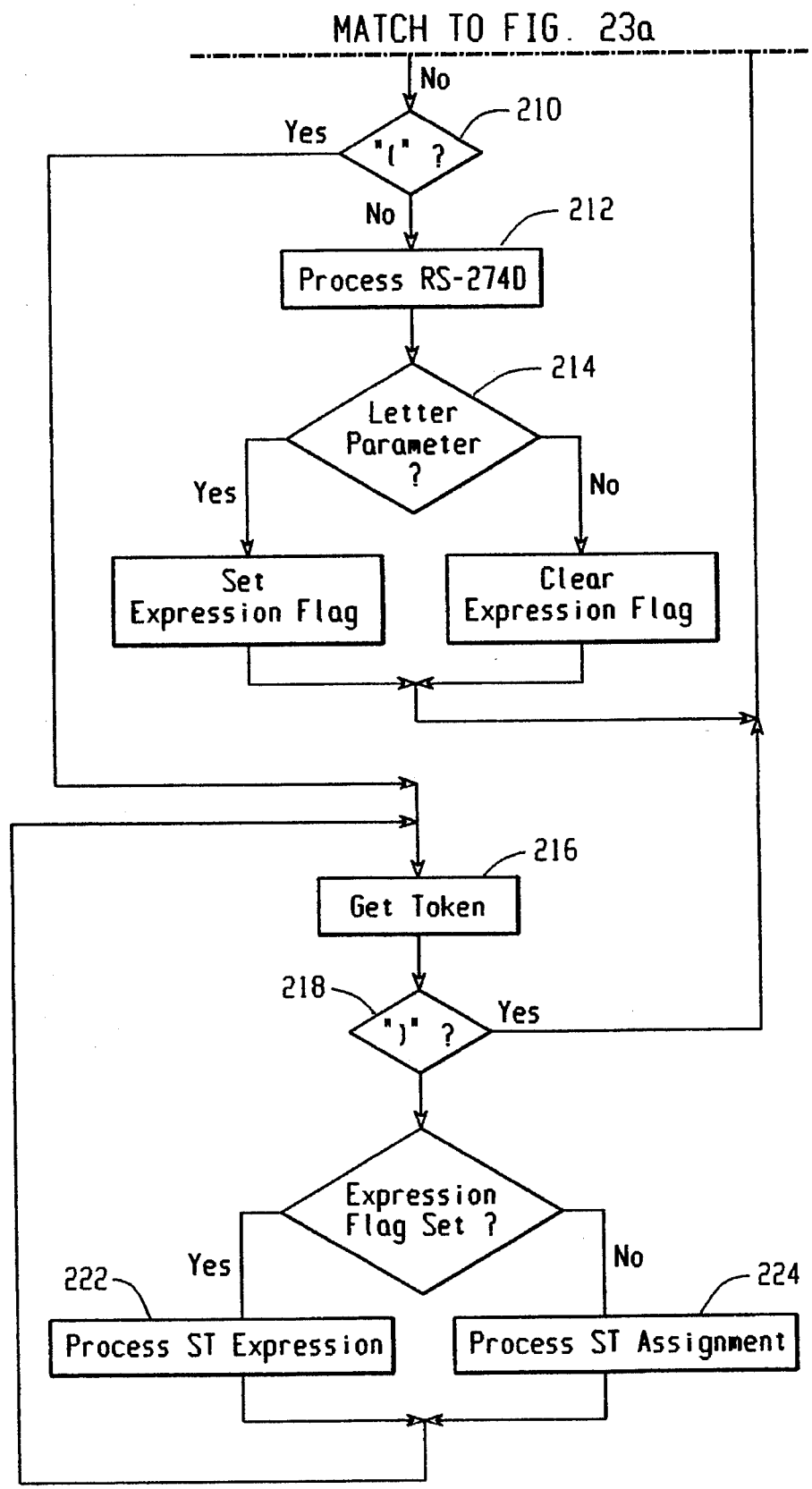

FIG. 23 shows a flowchart of the process used to decode RS-274D motion commands embedded within ST programs, and ST expressions and ST assignment statements embedded within RS-274D motion commands. In order to differentiate Structured Text commands from RS-274D motion commands, the RS-274D commands are enclosed within the keywords "BEGIN_RS274" and "END_RS274". Accordingly, when the interpreter recognizes the BEGIN_RS274 keyword (Step 202), it will begin interpreting the text as RS-274D commands at step 212. When the interpreter recognizes the "END_RS274" keyword (Step 208), it will resume interpreting the text as Structured Text commands at step 204.

In order to embed ST expressions and ST assignment statements within RS-274D motion commands, the expressions and assignment statements are enclosed with the characters "(" and ")". While interpreting the RS-274D motion commands, the interpreter recognizes the "(" character (step 210) and will begin interpreting the text as either a Structured Text expression (step 222) or Structured Text assignment statement (step 224). If the interpreter is in the process of decoding an RS-274D letter parameter (step 214), for example, the Y axis position in FIG. 8, the Structured Text will be interpreted as a Structured Text expression (step 222) and the result will be used as the value of the letter parameter. Otherwise, the Structured Text will be interpreted as a Structured Text assignment statement (step 224). When the interpreter is interpreting the Structured Text subset (step 216) and recognizes the character ")" (step 218), it will resume interpreting the text as standard RS-274D motion commands at step 206.

When Program Execution 186 activates a step box in an enhanced SFC, it scans the associated actions statement box on a regular timed interval. If an action qualifier is satisfied, the continuous program associated with the action qualifier is executed. When a synchronization qualifier is associated with the action qualifier, the synchronization qualifier must also be satisfied for the continuous program associated with the action qualifier to be executed. Program Execution 186 will read status information from external controller cards (i.e., I/O card 192 and motion control card 194) in order to determine if a synchronization qualifier is satisfied.

Figure 26A:
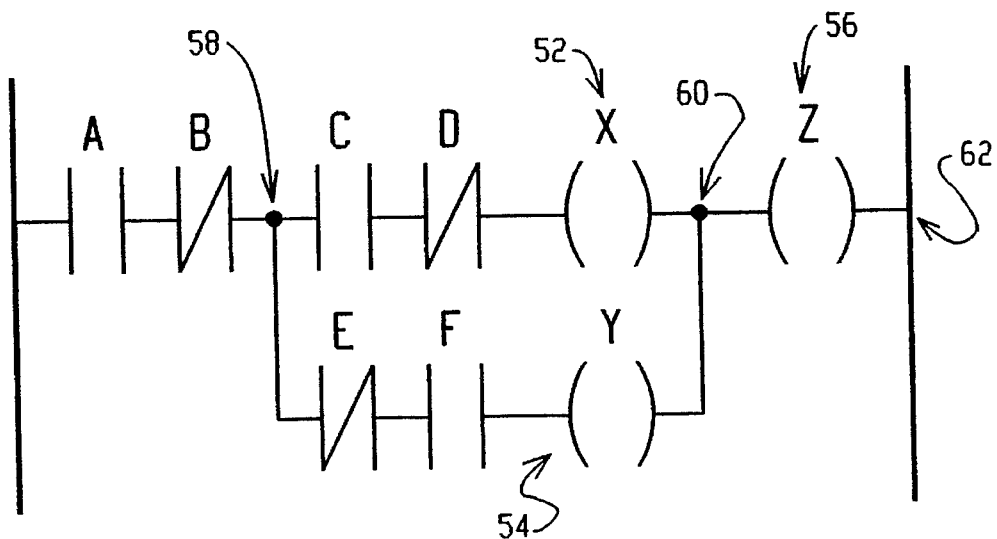
FIG. 26a shows a sample Relay Ladder Logic (RLL) Network having multiple logical outputs.

In order for Program Execution 186 to properly interpret Relay Ladder Logic Networks that contain logical outputs anywhere within a ladder logic rung, as in FIG. 26a, an enhanced standard algorithm for evaluating ladder logic is used. An enhancement of the standard algorithm allows for arbitrary positioning of logical outputs. In a preferred embodiment of the present invention, the partial result of the ladder logic rung at the point where branching begins has been termed the "root." In FIG. 26a the root at position 58 is "A and NOT B." The enhanced algorithm must also handle "roots" in a recursive manner on the stack since nested clusters of logical branching may occur at any point within a series of logical branches.

Referring to FIG. 26b, the enhanced standard algorithm works as follows: When the Instruction List (IL) program (which is generated by Logic Editor 184 from the Relay Ladder Logic Network shown in FIG. 26a) begins, the root exists but its value is not relevant (NULL) [line 2]. The evaluation of the IL program proceeds as expected until a "AND(" [line 6] or "ANDN(" is encountered. At which point the old root is pushed onto the stack [line 6], the root is set equal to the current result (R1) [line 7], the old result (R1) is pushed on the stack [line 8], the deferred operator "AND" is pushed on the stack [line 9], a new result R2 is created and initialized to 1 [line 10] and "anded" with the operand (C) [line 11] or the inverted value of the operand (not C) depending on whether the operation was an "AND(" [line 6] or "ANDN(" respectively.

If an "OR(" or "ORN(" [line 14] is encountered, the old result (R2) is pushed on the stack [line 14], the deferred operator "OR" is pushed on the stack [line 15], and new result (R3) is created [line 16], initialized to 1, and "anded" with the value of the Root [line 17]. The new result (R3) is then "anded" with the operand (E) or the inverted value of the operand (not E) [line 18] depending on whether the operation was "OR(" or "ORN(" [line 14] respectively.

If a ")" [line 21,25] is encountered, the deferred operator [line 21,25] and the old result [line 22,26] are popped off the stack. If the deferred operator is an "OR" [line 21], then the new result (R3) is "ored" with the old result (R2) and stored in the old result (R2) [line 23]; the new result (R3) is discarded [line 24] and the old result (R2) becomes the new result [line 23]. If the deferred operation is an "AND" [line 25], the old result is set equal to the new result [line 27], the new result (R2) is discarded [line 28], the old result (R1) becomes the new result [line 27], and the old root is popped off the stack [line 29] and becomes the current root.

Enhanced Debugging

A preferred embodiment of the present invention also provides enhanced debugging features. In this respect, the debugger of the present invention allows the user to playback system conditions occurring just prior to the detection of a programming problem. Accordingly, the user can view the conditions that caused the problem.

Figure 29:
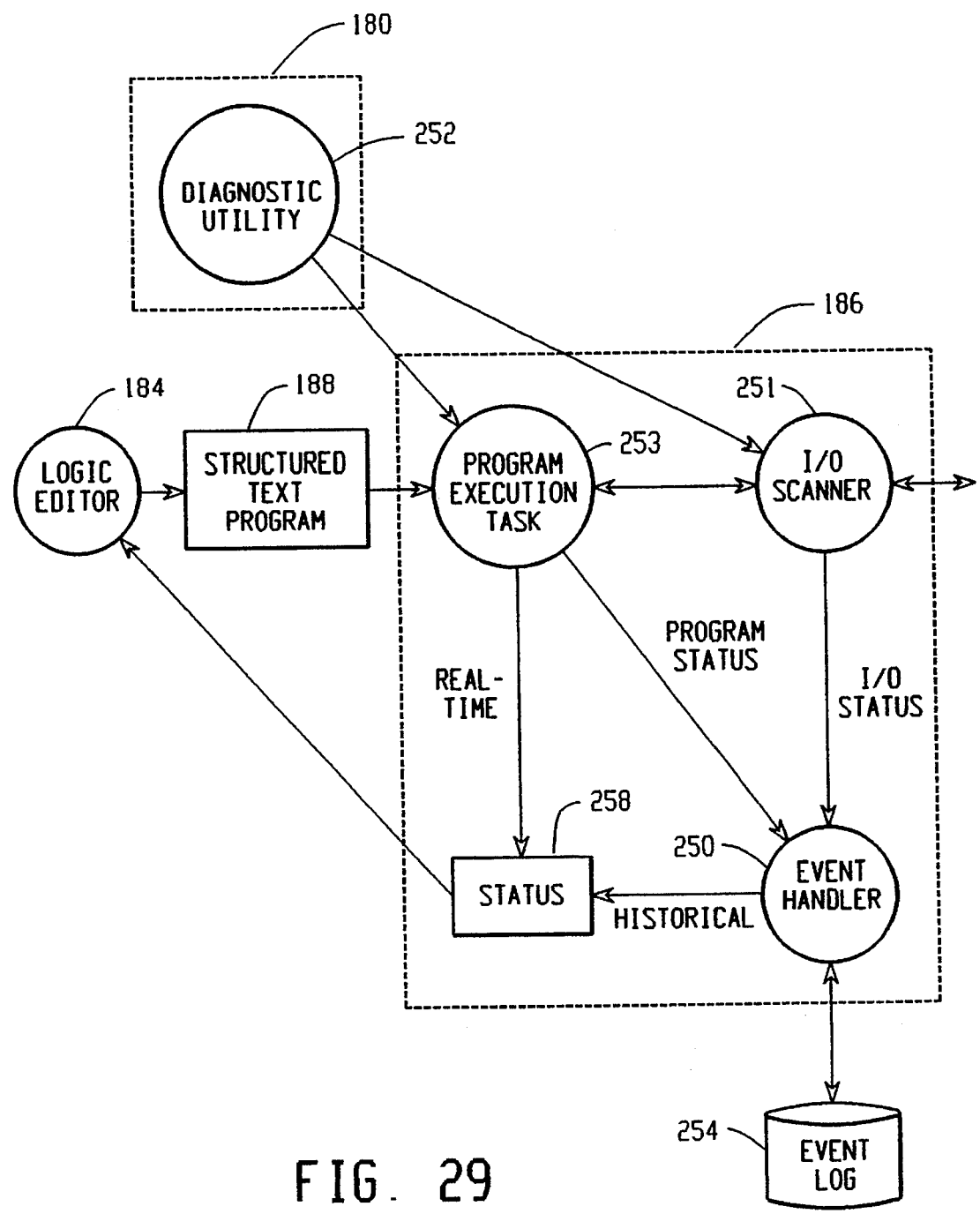
FIG. 29 shows a data flow diagram of the process used by the present invention to provide enhanced debugging features.

Referring now to FIG. 29, there is shown a data flow diagram of the process used to provide the enhanced debugging features of the present invention. An event handler 250 time tags events, sorts these events in time, and maintains a FIFO (first-in, first-out) of events in RAM and on event log 254. Thus, event handler 250 keeps the newest events and discards the older events. Event handler 250 is also used to store the I/O status (originating from I/O scanner 251) and program status information (originating from program execution task 253) occurring at a given moment. I/O status is the status of physical inputs and physical outputs of the controller, while program status is the status of the program being executed by the controller. Diagnostic utility 252 configures the I/O scanner and prograph execution task 253 to send I/O status and program status information to event handler 250 every I/O scan until a "breakpoint" is encountered. Breakpoints are commands which can be placed in sequential or continuous programs to signal I/O scanner 251 and program execution task 253 to respectively stop logging I/O status and program status information to event handler 250. This allows the user to review the contents of event log 254. A breakpoint is set in a sequential program steps as an action item (FIG. 30) or in a continuous program as a set of conditions (FIG. 31).

Figure 30:
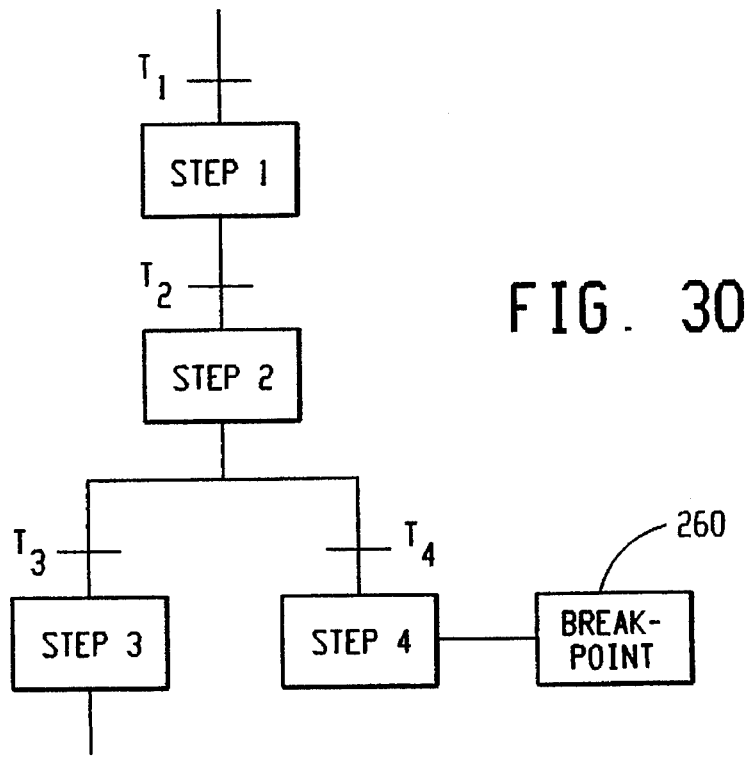
FIG. 30 shows a Sequential Function Chart having a breakpoint.
Figure 31:
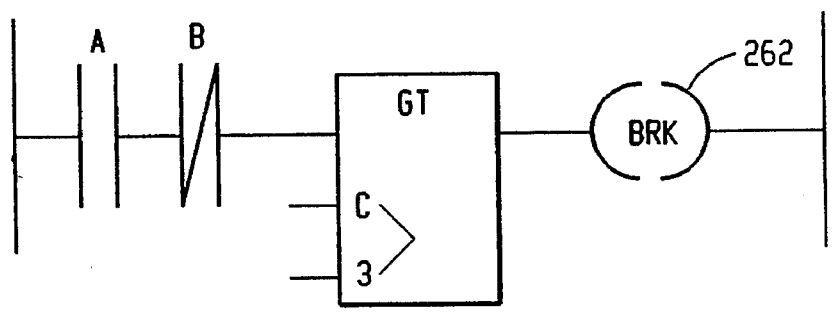
FIG. 31 shows a Relay Ladder Logic Network having a breakpoint.

With respect to FIG. 30, when step 4 becomes active, breakpoint 260 occurs. Likewise, in FIG. 31 if A and NOT B and C>3, are TRUE, breakpoint 262 occurs.

Furthermore, in a preferred embodiment of the present invention, a breakpoint may be placed in step boxes, action logic, on transitions, or Relay Ladder Logic rungs, in order to provide additional information to the user. The logging function of a breakpoint is a property of the breakpoint and is set by diagnostic utility 252. As noted above, Logic Editor 184 generates ST program 188 (from the enhanced SFC) for Program Execution Task 253. Program Execution Task 253 in turn generates status data 258 that Logic Editor 184 uses for displaying real-time program status. If a fault or failure is detected by any task including Program Execution Task 253, the task can log an event by sending the appropriate message to the Event Handler 250.

Diagnostic Utility 252 enables breakpoints in Structured Text Program 188 by sending internal messages to Program Execution Task 253 and I/O Scanner 251. Program Execution Task 253 is configured by Diagnostic Utility 252 to send program status information. Likewise, I/O scanner 251 is configured by Diagnostic Utility 252 to send I/O status information to Event Handler 250. Accordingly, for playback, Event Handler 250 uses event log 254 to provide status data 258 to Logic Editor 14. Logic Editor 184 will display past I/O status or past program status information to the user.

Event handler 250 logs a series of I/O status and program status information representing a snapshot of the state of the controller at a particular instance in time. Each snapshot will be referred to as a "frame." Once the frames are captured and the fault condition has been detected, the log of the frames may be replayed to the user to observe the conditions that existed prior to the detection of fault. Accordingly, the frames may be replayed either in the forward or reverse timing direction as required. When replayed, the I/O status and program status information may be reviewed by the user in detail in order to determine the cause of the fault.

The enhanced SFC program can be used to observe event log 254 in a graphical form. In this respect, as event log 254 is replayed, the program status information can be used to highlight step boxes and action step boxes, and the I/O status information can be used to highlight the I/O input and outputs in a Relay Ladder Logic Network. Accordingly, both can be displayed on the same screen. In this way, the user can view the controller status conditions one step at a time, in real time to see what I/O conditions or program conditions may have caused the programming problem or fault.

In addition, a time tag (i.e., time stamp) is recorded with each frame and is played back along with the I/O status and program status information. The time tag can be used to determine the exact time between recorded events. Accordingly, events can be logged every scan, on a periodic basis, or when problems or events occur. Accordingly, event log 254 can be used to generate status information displays such as an I/O timing diagram, an I/O contact history, an I/O trend diagram, or an SFC+ execution trace.

Manual Application Sequencer

A manual application sequencer program ties a simple sequence of operator buttons to steps of an application program. It will also be appreciated that operator buttons can be tied to the application program itself, rather than individual steps of the application program. The manual application sequencer display 280 shown in FIG. 32 consists of a series of buttons arranged in rows from left to right, top to bottom, with arrows indicating the button sequencing. These buttons are highlighted in colors to indicate which steps of an application program are being executed. Each button corresponds to a step in the application program. When an application manual mode is active, these buttons are used by the operator to manually sequence through the steps of the application program.

Each button of the manual application sequencer display 280 is displayed with an inactive color (e.g., gray) to indicate that the associated step is not active. When an application program step is ready to be activated, the associated button is displayed with a ready color (e.g., yellow). When the operator pushes the ready button, the associated step is executed, and the button is displayed with an active color (e.g., green). The button is displayed with the active color until the associated application program step is completed. When the application program step is completed, the button is displayed with an inactive color, and the next button in sequence is displayed with a ready color. If an error occurs, the active button is displayed with an error color (e.g., red).

Figure 32:
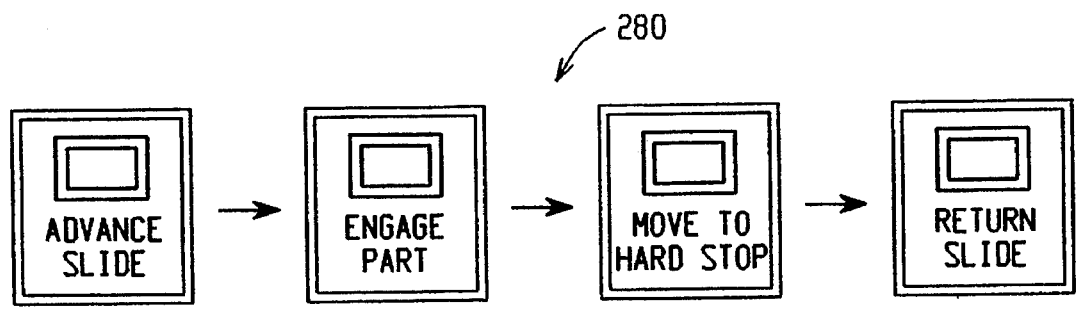
FIG. 32 shows a representative manual application sequencer display.
Figure 33:
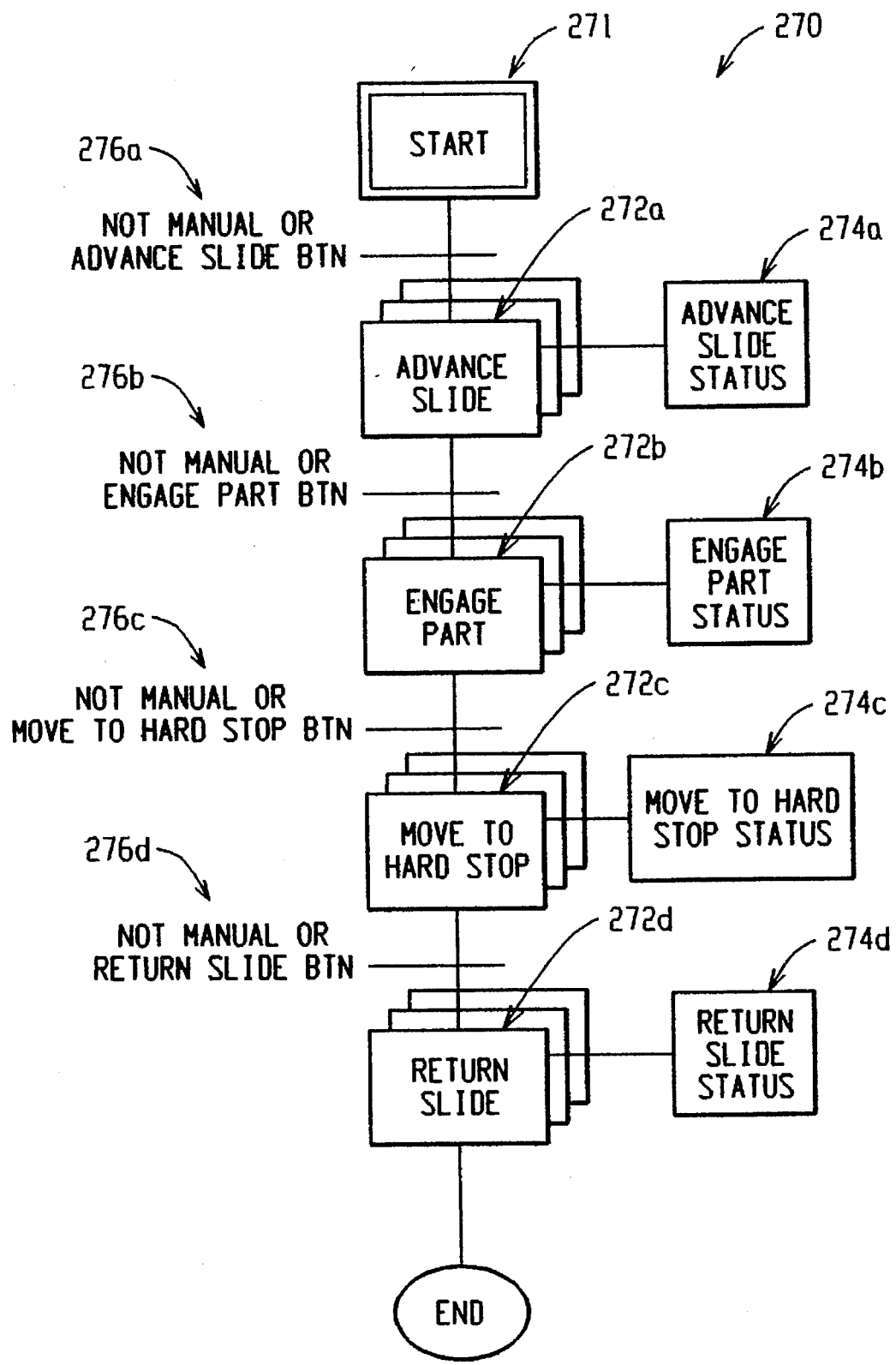
FIG. 33 shows a representative application program for use with the manual application sequencer display of the present invention.

The manual application sequencer program generates a top-level format SFC+ 270, as shown in FIG. 33. Each button in the manual application sequencer display 280 is tied to a macro step 272 in the application program. Preceding each macro step is a transition statement 276 which causes the application program to wait for the associated button to be pressed before continuing (when the application program is in manual mode). For example, if the Advance Slide button in FIG. 32 is pressed it would set the Advance Slide Btn boolean variable (see transition statement 276a), which in turn would cause application program 270 to transition from step 271 (start) to macro step 272a (Advance Slide). Accordingly, when a button is pressed, the application program step associated with that button is executed. When that step is completed, the application program waits for the next button to be pressed.

Action logic 274 is attached to each application program step. This logic turns on boolean memory variables which indicate that the step is ready, the step is active, or an error has occurred in the step. These boolean memory variables are used by the manual application sequencer program to set the color of the buttons.

Each macro step in the application program contains a subordinate SFC+ which the application engineer creates to perform the functions required in that macro step. For example, macro step 272a (Advance Slide) in FIG. 33 contains a subordinate SFC+ which specifies the details of the advance slide function. The subordinate SFC+ begins executing when the macro step is activated. When the subordinate SFC+ completes, the macro step complete indicator is turned on.

In addition, a special operation program can be created to perform a special operation, which must be periodically performed during the application program. Buttons can be tied to the special operation program, allowing the operator to manually activate the special operation program. When the special operation program is complete, the buttons attached to the application program will once again be activated with the context restored previous to the execution of the special operation program.

The graphic sequencer buttons and the program editing and execution are implemented in a manner well known to those skilled in the art. The manual application sequencer buttons are attached to the application program by either using the same file name with different file extensions or by including both the application program and the manual application sequencer program in a common file.

The present invention has been described with reference to a preferred embodiment. Other modifications and alterations will occur to those skilled in the art upon a reading and understanding of the present specification. It is intended that all such modifications and alterations be included insofar as they come within the scope of the appended claims or equivalents thereof.

Having thus described the invention, the following is claimed:

1. An apparatus for the development and execution of an application program having at least one sequential program for controlling at least one sequential machine function and having at least one continuous program for controlling at least one continuous machine function, said apparatus comprising:
   means for producing the application program in the form of a diagram, said means for producing including:
      means for producing at least one step box having therein a sequential program including one or more sequential program statements, each sequential program statement including a sequential program statement label, and
      means for producing at least one action box having therein at least one continuous program identifier for identifying a continuous program, each continuous program identifier associated with at least one sequential program statement label, each said action box associated with one of said at least one step boxes;
   execution means for executing said application program; and
   means for linking said at least one step box and said at least one action box for producing said application program.

2. The apparatus of claim 1, wherein said execution means determines when to execute each continuous program identified in said action box, before executing said sequential program statements in the step box associated therewith.

3. The apparatus of claim 1, wherein said at least one sequential machine function is motion control.

4. The apparatus of claim 1, wherein said at least one sequential machine function is process control.

5. The apparatus of claim 1, wherein said sequential program statements are in at least one of the following formats: RS-274D syntax, application icon, BASIC, Fortran, and C.

6. The apparatus of claim 5, wherein said RS-274D syntax includes at least one of the following: embedded Structured Text, embedded BASIC, embedded Fortran, and embedded C.

7. The apparatus of claim 1, wherein said continuous program identified by the continuous program identifier is in at least one of the following formats: Relay Ladder Logic Networks and Function Blocks.

8. The apparatus of claim 1, wherein said execution means includes means for evaluating Relay Ladder Logic Networks having output elements and function blocks anywhere in the Relay Ladder Logic Networks.

9. The apparatus of claim 1, wherein said sequential program statements and said continuous programs identified by said continuous program identifier include program statements which cause the execution means to temporarily suspend execution of the currently executing application program and begin execution of a second application program.

10. The apparatus of claim 1, wherein said apparatus further comprises:
   means for producing the application program in the form of a top level diagram, said top level diagram including application program steps, each step representing at least one sequential or continuous program; and
   means for associating an operator button with each said application program step, said operator button activated by an operator, wherein said operator button associated with each application program step must be activated before said at least one program associated with the application program step is executed by said execution means.

11. The apparatus of claim 10, wherein said top level diagram includes transition statements, each transition statement associated with an application program step, said transition statements preventing execution of subsequent application program steps until an operator button associated with the subsequent application program step is activated by an operator.

12. The apparatus of claim 1, wherein said execution means begins executing said continuous program identified by said continuous program identifier in the action box, before executing the sequential program statements in the associated step box.

13. The apparatus of claim 1, wherein said continuous program identifier in said action box further identifies a sequential program statement in said associated step box, said execution means executing said continuous program identified by the continuous program identifier in response to the execution of the sequential program statement identified by the continuous program identifier.

14. The apparatus of claim 1, wherein said continuous program identifier in said action box further identifies a sequential program statement in said associated step box and a synchronization event associated with said identified sequential program statement, said execution means executing said continuous program identified by the continuous program identifier in response to the execution of said identified sequential program statement and the occurrence of said identified synchronization event associated with the identified sequential program statement.

15. The apparatus of claim 1, wherein said continuous program identifier in said action box further identifies an action qualifier associated with said identified continuous program, said execution means executing said identified continuous program in accordance with the identified action qualifier.

16. The apparatus of claim 1, wherein said apparatus further comprises means for displaying said identified continuous program.

17. The apparatus of claim 16, wherein said apparatus further comprises means for inserting a function block into said identified continuous program.

18. An apparatus for the development and execution of an application program having at least one sequential program for controlling at least one sequential machine function and having at least one continuous program for controlling at least one continuous machine function, said apparatus comprising:
   means for producing the application program in the form of a diagram, said means for producing including:
      means for producing at least one step box having therein a sequential program including one or more sequential program statements, each sequential program statement including a sequential program statement label, and
      means for producing at least one action box having therein at least one continuous program, each continuous program associated with at least one sequential program statement label, each said action box associated with one of said at least one step boxes;

execution means for executing said application program; and means for linking said at least one step box and said at least one action box for producing said application program.

* * * * *